(12) United States Patent
Choo et al.

(10) Patent No.: US 12,493,307 B2
(45) Date of Patent: Dec. 9, 2025

(54) FAST SWITCHING GAS CIRCUITS AND PROCESSING CHAMBERS, AND RELATED METHODS AND APPARATUS, FOR GAS STABILIZATION

(71) Applicant: Applied Materials, Inc., Santa Clara, CA (US)

(72) Inventors: Enle Choo, Saratoga, CA (US); Martin Truemper, Austin, TX (US); Shu-Kwan Lau, Sunnyvale, CA (US); Jason Jewell, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 54 days.

(21) Appl. No.: 18/484,057

(22) Filed: Oct. 10, 2023

(65) Prior Publication Data

US 2025/0066915 A1    Feb. 27, 2025

Related U.S. Application Data

(60) Provisional application No. 63/533,819, filed on Aug. 21, 2023.

(51) Int. Cl.
| | |
|---|---|
| *G05D 11/13* | (2006.01) |
| *C23C 16/455* | (2006.01) |
| *C23C 16/52* | (2006.01) |
| *G05D 7/06* | (2006.01) |

(52) U.S. Cl.
CPC ...... *G05D 11/132* (2013.01); *C23C 16/45561* (2013.01); *C23C 16/52* (2013.01); *G05D 7/0635* (2013.01)

(58) Field of Classification Search
CPC ................ G05D 11/132; G05D 7/0635; Y10T 137/87241; C23C 16/45561; C23C 16/52
USPC ........................................................ 137/597
See application file for complete search history.

(56) References Cited

U.S. PATENT DOCUMENTS

| | | | |
|---|---|---|---|
| 5,488,967 A | 2/1996 | Minami et al. | |
| 8,834,955 B2 | 9/2014 | Bauer et al. | |
| 9,879,795 B2 * | 1/2018 | Burkhart | B33Y 80/00 |
| 10,022,689 B2 * | 7/2018 | Shareef | B01F 23/10 |

(Continued)

FOREIGN PATENT DOCUMENTS

| | | | |
|---|---|---|---|
| CN | 114150381 A | 3/2022 | |
| WO | 2019195292 A1 | 10/2019 | |
| WO | WO-2020159791 A1 * | 8/2020 | ....... C23C 16/45512 |

*Primary Examiner* — William M McCalister
(74) *Attorney, Agent, or Firm* — Patterson + Sheridan, LLP

(57) ABSTRACT

Embodiments generally relate to gas circuits for distributing gases for processing of substrates applicable for semiconductor manufacturing. In one or more embodiments, flow controllers of a gas circuit are used to stabilize, distribute, and switch gases for processing of substrates applicable for semiconductor manufacturing. In one or more embodiments, a gas circuit includes one or more first flow controllers operable to flow a first gas, one or more second flow controllers operable to flow a second gas, and one or more valve assemblies. The valve assembl(ies) include a first supply line connected to a respective first flow controller and a second supply line connected to a respective second flow controller. The gas circuit further includes a plurality of valves operable to open and close the respective flow of the first gas and the second gas received from the first flow controller(s) and the second flow controller(s).

14 Claims, 31 Drawing Sheets

(56) References Cited

U.S. PATENT DOCUMENTS

| | | | |
|---|---|---|---|
| 10,118,263 B2* | 11/2018 | Kellogg | B23P 19/12 |
| 10,128,087 B2* | 11/2018 | Taskar | B01F 25/31423 |
| 10,453,721 B2 | 10/2019 | Brashear et al. | |
| 10,460,960 B2* | 10/2019 | Kumar | H01L 21/67017 |
| 11,940,819 B1* | 3/2024 | Chowdhury | B01F 23/191 |
| 2014/0137961 A1* | 5/2014 | Kao | H01L 21/67017 |
| | | | 137/561 R |
| 2014/0209177 A1* | 7/2014 | Bauer | C23C 16/52 |
| | | | 137/8 |
| 2016/0147234 A1* | 5/2016 | Leeser | F16K 7/17 |
| | | | 137/596.12 |

* cited by examiner

FAST SWITCHING GAS CIRCUITS AND PROCESSING CHAMBERS, AND RELATED METHODS AND APPARATUS, FOR GAS STABILIZATION

CROSS-REFERENCE TO RELATED APPLICATIONS

This application claims priority to U.S. Provisional Patent Application Ser. No. 63/533,819, filed on Aug. 21, 2023, which is herein incorporated by reference in its entirety.

BACKGROUND

Field

Embodiments of the present disclosure generally relate to gas circuits for distributing gases for processing of substrates applicable for semiconductor manufacturing. In one or more embodiments, flow controllers of a gas circuit are used to stabilize, distribute, and switch gases for processing of substrates applicable for semiconductor manufacturing.

Description of the Related Art

Semiconductor substrates are processed for a wide variety of applications, including the fabrication of integrated devices and microdevices. Operations (such as epitaxial deposition operations) can involve a multitude of process gases. These gases may need to be stabilized before introduction into process chambers. Operations can incur time to stabilize gases use. Operations can also involve large iterations of purging between gas flows. The amount of time needed for stabilization and purging can cause processing delays, reduced throughput, and high operational costs.

Therefore, what is needed in the art are improved gas circuits and substrate processing methods.

SUMMARY

Embodiments of the present disclosure generally relate to gas circuits for distributing gases for processing of substrates applicable for semiconductor manufacturing. In one or more embodiments, flow controllers of a gas circuit are used to stabilize, distribute, and switch gases for processing of substrates applicable for semiconductor manufacturing. As an example, the flow controllers can stabilize and switch the flow of different gases in a manner that is quick and efficient.

In one or more embodiments, a gas circuit includes one or more first flow controllers operable to flow a first gas, one or more second flow controllers operable to flow a second gas, and one or more valve assemblies. The one or more valve assemblies include a first supply line connected to a respective first flow controller and a second supply line connected to a respective second flow controller. The gas circuit further includes a plurality of valves operable to open and close the respective flow of the first gas and the second gas received from the one or more first flow controllers and the one or more second flow controllers.

In one or more embodiments, a process chamber includes a processing volume at least partially defined by a chamber body, an injector operable to inject a first gas and a second gas into a plurality of zones of the processing volume, one or more gas lines connected to the injector and operable to flow the first gas and the second gas to the injector, and one or more valve assemblies connected to the one or more gas lines. The one or more valve assemblies include a plurality of valves operable to open and close the respective flow of the first gas and the second gas, a first supply line, and a second supply line. The process chamber further includes one or more first flow controllers operable to flow the first gas to the one or more valve assemblies, and one or more second flow controllers operable to flow the second gas to the one or more valve assemblies.

In one or more embodiments, a method for substrate processing includes flowing an inert gas into a processing volume of a processing chamber through a first valve, flowing a first gas to a vent line through a first vent valve until a stabilization condition is met, and when the stabilization condition is met, switching the first gas to flow into the processing volume while the inert gas is flowing into the processing volume. The switching includes closing the first vent valve and opening a second valve while the first valve is open.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Aspects of the present disclosure relate to gas circuits for distributing gases for processing of substrates applicable for semiconductor manufacturing. In one or more embodiments, flow controllers of a gas circuit are used to stabilize, distribute, and switch gases for processing of substrates applicable for semiconductor manufacturing.

Figure 1:
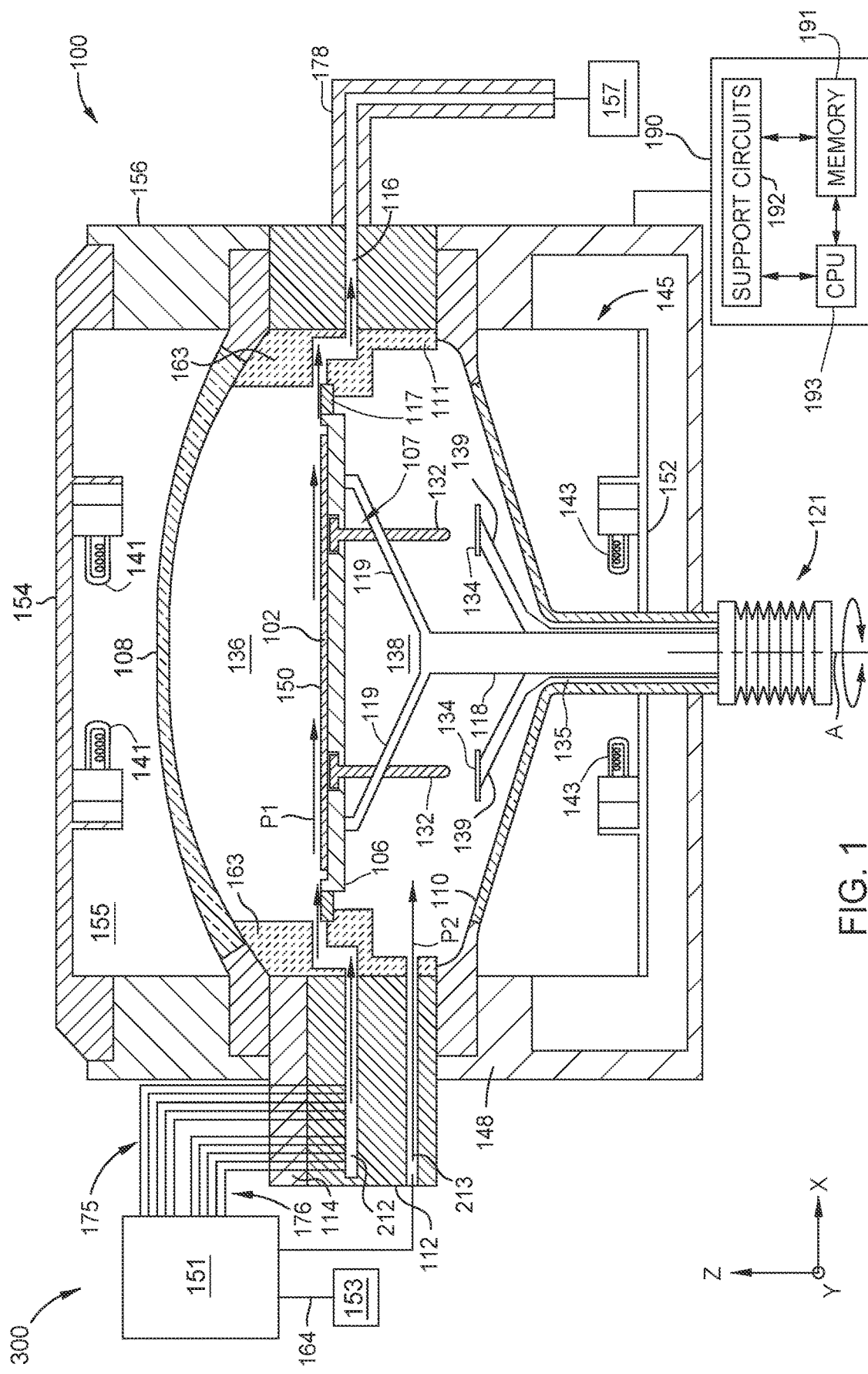
FIG. 1 is a schematic side cross-sectional view of a processing chamber and a gas circuit, according to one or more embodiments.

FIG. 1 is a schematic side cross-sectional view of a processing chamber 100 and a gas circuit 300, according to one or more embodiments. The processing chamber 100 is a deposition chamber. In one or more embodiments, the processing chamber 100 is an epitaxial deposition chamber. The processing chamber 100 is utilized to grow an epitaxial film on a substrate 102. The processing chamber 100 creates a cross-flow of reactive gases across a top surface 150 of the substrate 102. The processing chamber 100 is shown in a processing condition in FIG. 1.

The processing chamber 100 includes an upper body 156, a lower body 148 disposed below the upper body 156, and an injector 112 disposed between the upper body 156 and the lower body 148. The injector 112 can be a ring, for example. The injector 112 can be arcuate or rectangular in shape. The upper body 156, the injector 112, and the lower body 148 form a chamber body. Disposed within the chamber body is a substrate support 106, an upper window 108 (such as an upper dome), a lower window 110 (such as a lower dome), a plurality of upper heat sources 141, and a plurality of lower heat sources 143. In one or more embodiments, the upper heat sources 141 include upper lamps and the lower heat sources 143 include lower lamps. The present disclosure contemplates that other heat sources may be used (in addition to or in place of the lamps) for the various heat sources described herein. For example, resistive heaters, light emitting diodes (LEDs), and/or lasers may be used for the various heat sources described herein.

The substrate support 106 is disposed between the upper window 108 and the lower window 110. The substrate support 106 supports the substrate 102. In one or more embodiments, the substrate support 106 includes a susceptor. Other substrate supports (including, for example, a substrate carrier and/or one or more ring segment(s) that support one or more outer regions of the substrate 102) are contemplated by the present disclosure. The plurality of upper heat sources 141 are disposed between the upper window and a lid 154. The plurality of upper heat sources 141 form a portion of the upper heat source module 155.

The plurality of lower heat sources 143 are disposed between the lower window 110 and a floor 152. The plurality of lower heat sources 143 form a portion of a lower heat source module 145. The upper window 108 is an upper dome and/or is formed of an energy transmissive material, such as quartz. The lower window 110 is a lower dome and/or is formed of an energy transmissive material, such as quartz.

A processing volume 136 and a purge volume 138 are formed between the upper window 108 and the lower window 110. The processing volume 136 and the purge volume 138 are part of an internal volume defined at least partially by the upper window 108, the lower window 110, and one or more liners 111.

The internal volume has the substrate support 106 disposed therein. The substrate support 106 includes a top surface on which the substrate 102 is disposed. The substrate support 106 is attached to a shaft 118. In one or more embodiments, the substrate support 106 is connected to the shaft 118 through one or more arms 119 connected to the shaft 118. The shaft 118 is connected to a motion assembly 121. The motion assembly 121 includes one or more actuators and/or adjustment devices that provide movement and/or adjustment for the shaft 118 and/or the substrate support 106 within the processing volume 136.

The substrate support 106 may include lift pin holes 107 disposed therein. The lift pin holes 107 are each sized to accommodate a lift pin 132 for lifting of the substrate 102 from the substrate support 106 before or after a deposition process is performed. The lift pins 132 may rest on lift pin stops 134 when the substrate support 106 is lowered from a process position to a transfer position. The lift pin stops 134 can include a plurality of arms 139 that attach to a shaft 135.

Figure 2:
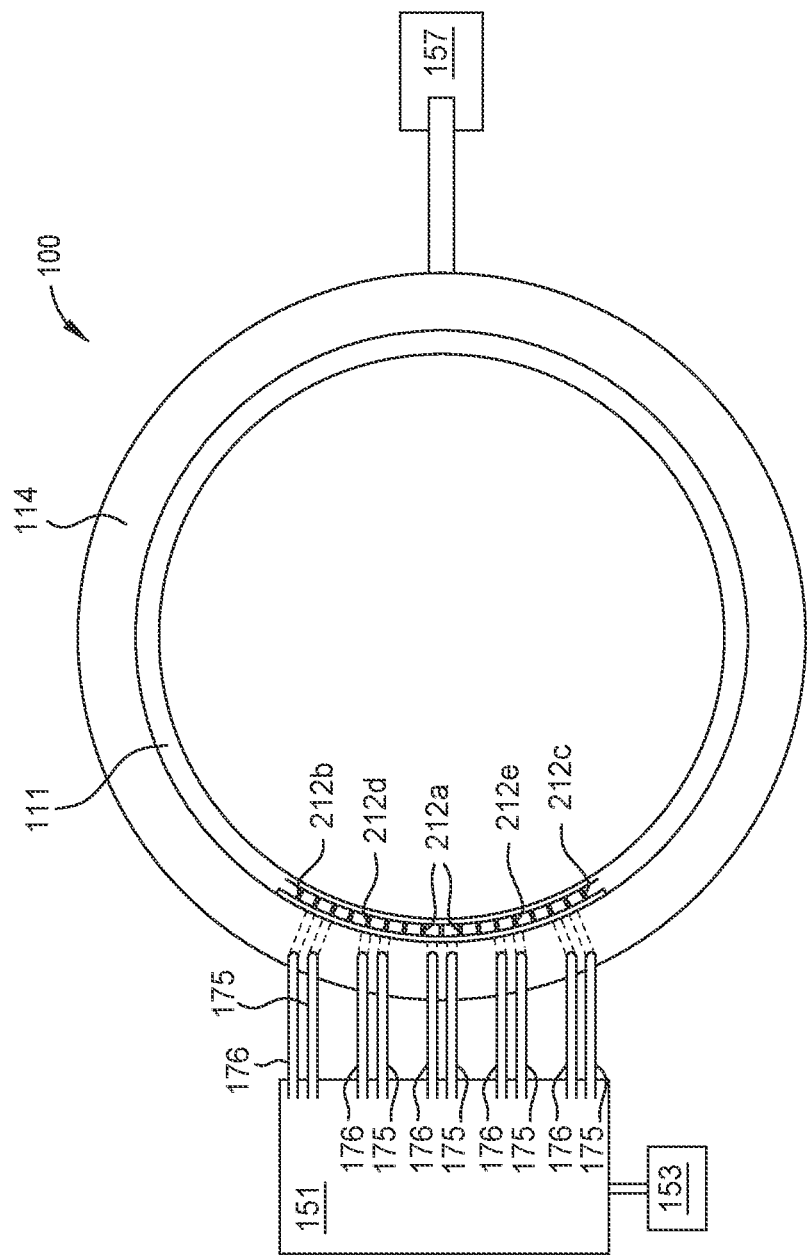
FIG. 2 is a schematic top view of the processing chamber shown in FIG. 1, according to one or more embodiments.

The injector 112 includes one or more gas inlets 212 (e.g., a plurality of gas inlets) and one or more gas exhaust outlets 116. Using the one or more gas inlets 212, the injector 112 is operable to inject one or more reactive gases, one or more carrier gases, and one or more purge gases to different zones of the processing volume 136 as shown in FIG. 2. In one or more embodiments, during a deposition operation and/or a cleaning operation, the one or more gas inlets 212 supply a process gas P1 (including one or more reactive gases) to the processing volume 136 while one or more second gas inlets 213 supply a purge gas P2 to the purge volume 138. In one or more embodiments and as shown in FIG. 1, the one or more gas inlets 212 and/or the one or more second gas inlets 213 are disposed on the opposite side of the injector 112 from the one or more gas exhaust outlets 116. A pre-heat ring 117 is disposed below the one or more gas inlets 212 and the one or more gas exhaust outlets 116. The pre-heat ring 117 is disposed outwardly of the substrate support 106, and the pre-heat ring 117 is supported at least partially by the one or more liners 111. The one or more liners 111 line an inner surface of the injector 112 and protect the injector 112 from reactive gases used during deposition operations and/or cleaning operations. The gas inlet(s) 212 are positioned to flow a respective one or more reactive gas and one or more carrier gases parallel to the top surface 150 of a substrate 102 disposed within the processing volume 136. The one or more gas exhaust outlets 116 are connected to an exhaust pump 157. The one or more reactive gases supplied can include one or more of silicon (Si), phosphorus (P), germanium (Ge), and/or chlorine (Cl). The one or more carrier gases can include one or more of nitrogen ($N_2$) and/or hydrogen ($H_2$) and/or argon. The one or more purge gases can include hydrogen ($H_2$), argon (Ar), helium (He), and/or nitrogen ($N_2$)). In one or more embodiments, one or more cleaning gases can be introduced into the chamber from the gas inlet(s) 212. One or more cleaning gases can include one or more of hydrogen (H) and/or chlorine (Cl). In one or more embodiments, the one or more reactive gases include silicon phosphide (SiP) and/or phospine ($PH_3$), and the one or more cleaning gases include hydrochloric acid (HCl).

The injector 112 (which can be at least part of a sidewall of the processing chamber 100) includes the one or more gas inlets 212 in fluid communication with the processing volume 136. The one or more gas inlets 212 are in fluid communication with one or more flow openings formed in or between the one or more liners 111.

The one or more gas exhaust outlets 116 are further connected to or include an exhaust system 178. The exhaust system 178 connects the one or more gas exhaust outlets 116 and the exhaust pump 157. The exhaust system 178 can assist in the controlled deposition of a layer on the substrate 102. The exhaust system 178 can assist in the controlled etching of the substrate 102. The exhaust system 178 is disposed on an opposite side of the processing chamber 100 relative to the gas inlet(s) 212.

In one or more embodiments, a gas cap 114 is disposed on the injector 112. A gas panel 151 is connected to the gas cap 114 via a first set of gas lines 175 and a second set of gas lines 176. The gas panel 151 is configured to connect to gas sources that provide the reactive gases, carrier gases, and purge gases to the gas inlets 212 through the gas panel 151. In one or more embodiments, one or more first gases (such as deposition gases) are used in processing that are incompatible with one or more second gases (such as etching gases or cleaning gases) that are used in processing. The first set of gas lines 175 delivers the first gases to the gas cap 114. The second set of gas lines 176 transports the second gases to the gas cap 114. One or more vent lines 164 connect the gas panel 151 to a vent outlet 153. The vent outlet 153 can be connected to the exhaust pump 157. In one or more embodiments, the first set of gas lines 175 and the second set of gas lines 176 are connected to the vent outlet 153 via a vent line 164. The gas panel 151, the vent outlet 153, the first set of gas lines 175, the second set of gas lines 176, and the vent lines 164 are further described in FIGS. 2 and 3.

During a deposition operation (e.g., an epitaxial growth operation), the one or more first gases are delivered to the one or more gas inlets 212 through the first set of gas lines 175. The one or more first gases flow through the one or more gas inlets 212, through the one or more gaps, to flow over the substrate 102. The one or more first gases are exhausted through the one or more liners 111, and through the one or more gas exhaust outlets 116. In some embodiments, the first gases are suspended in one or more carrier gases.

During an etching operation or a cleaning operation, one or more second gases are delivered to the one or more gas inlets 212 through the second set of gas lines 176. The one or more second gases flow through the one or more gas inlets 212, through the one or more liners 111, and into the processing volume 136.

A controller 190 (described below) can control the deposition process, etching process, and/or cleaning process. As shown, the controller 190 is in communication with the processing chamber 100 and is used to control processes and methods, such as the operations of the methods (e.g., FIGS. 4A-4G, method 500, FIGS. 9A-9G, and/or method 1000) described herein.

The controller 190 is configured to receive data or input as sensor readings from a plurality of sensors. The sensors can include, for example: sensors that monitor growth of layer(s) on the substrate 102; sensors to monitor the flow of reactive gases in the gas panel 151 and first and second set of gas lines 175, 176; and/or sensors that monitor temperatures of the substrate 102, the substrate support 106, and/or the liners 111, 163. The controller 190 is equipped with or in communication with a system model of the processing chamber 100. The system model can include a heating model, a film uniformity model, a film deposition rate model, a coating model, a rotational position model, and/or a gas flow model. The system model is a program configured to estimate parameters (such as gas flow rate, a gas pressure, a processing temperature of the substrate support 106 and/or the substrate 102, a rotational position of component(s), a heating profile, a coating condition, and/or an etching condition) within the processing chamber 100 throughout a deposition operation, a cleaning operation, and/or an etching operation. The controller 190 is further configured to store readings and calculations. The readings and calculations include previous sensor readings, such as any previous sensor readings within the processing chamber 100. The readings and calculations further include the stored calculated values from after the sensor readings are measured by the controller 190 and run through the system model. Therefore, the controller 190 is configured to both retrieve stored readings and calculations as well as save readings and calculations for future use. Maintaining previous readings and calculations enables the controller 190 to adjust the system model over time to reflect a more accurate version of the processing chamber 100.

The controller 190 can monitor, estimate an optimized parameter, calibrate one or more flow rate sensors, generate an alert on a display, halt a deposition operation, initiate a chamber downtime period, delay a subsequent iteration of the deposition operation, initiate an etching operation, halt the etching operation, adjust a heating power, and/or otherwise adjust the process recipe.

The controller 190 includes a central processing unit (CPU) 193 (e.g., a processor), a memory 191 containing instructions, and support circuits 192 for the CPU 193. The controller 190 controls various items directly, or via other computers and/or controllers. In one or more embodiments, the controller 190 is communicatively coupled to dedicated controllers, and the controller 190 functions as a central controller.

The controller 190 is of any form of a general-purpose computer processor that is used in an industrial setting for controlling various substrate processing chambers and equipment, and sub-processors thereon or therein. The memory 191, or non-transitory computer readable medium, is one or more of a readily available memory such as random access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)), read only memory (ROM), floppy disk, hard disk, flash drive, or any other form of digital storage, local or remote. The support circuits 192 of the controller 190 are coupled to the CPU 193 for supporting the CPU 193. The support circuits 192 include cache, power supplies, clock circuits, input/output circuitry and subsystems, and the like. Operational parameters (such as deposition processes, cleaning process, and etching processes as discussed in FIGS. 4A-4G, FIG. 5, and FIGS. 9A-9G, and FIG. 10) and operations are stored in the memory 191 as a software routine that is executed or invoked to turn the controller 190 into a specific purpose controller to control the operations of the various chambers/modules described herein. The controller 190 is configured to conduct any of the operations described herein. For example, the instructions stored on the memory, when executed, cam cause one or more of operations of: FIG. 1, FIG. 3, FIGS. 4A-4G, method 500, FIGS. 9A-9G, and/or method 1000 to be conducted in relation to the processing chamber 100. The controller 190 and the processing chamber 100 are at least part of a system for processing substrates.

The various operations described herein (such as the operations of FIG. 1, FIG. 3, FIG. 4A-4G, method 500, FIGS. 9A-9G, and/or method 1000) can be conducted automatically using the controller 190, or can be conducted automatically or manually with certain operations conducted by a user.

In one or more embodiments, the controller 190 includes a mass storage device, an input control unit, and a display unit. The controller 190 monitors the temperature of the substrate 102, the temperature of the substrate support 106, process gas flow, and/or purge gas flow. In one or more embodiments, the controller 190 includes multiple controllers 190, such that the stored readings and calculations and the system model are stored within a separate controller from the controller 190, which controls the operations of the processing chamber 100. In one or more embodiments, all of the system model and the stored readings and calculations are saved within the controller 190.

Figure 3:
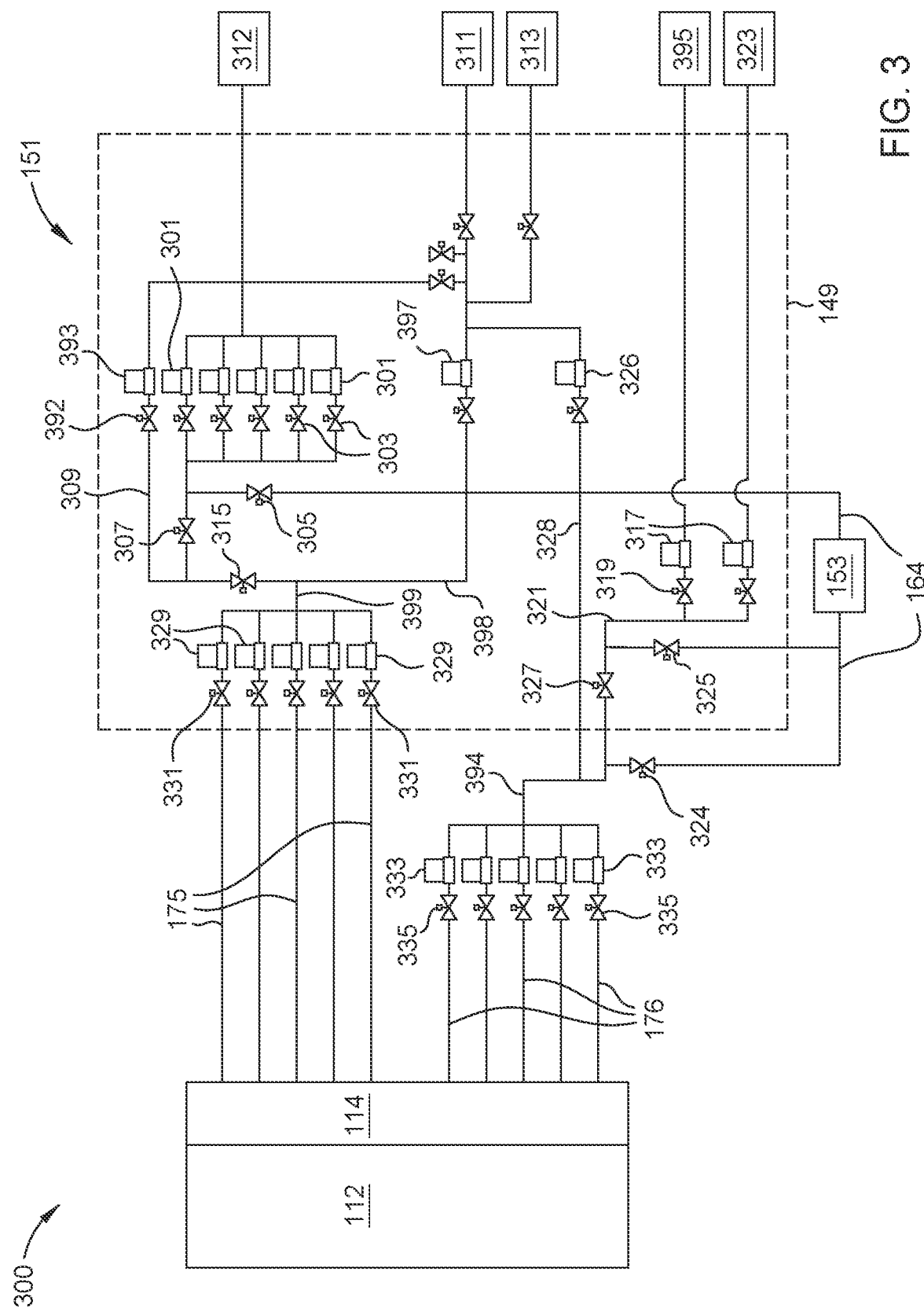
FIG. 3 is a schematic view of the gas circuit shown in FIG. 1, according to one or more embodiments.
Figure 4A:
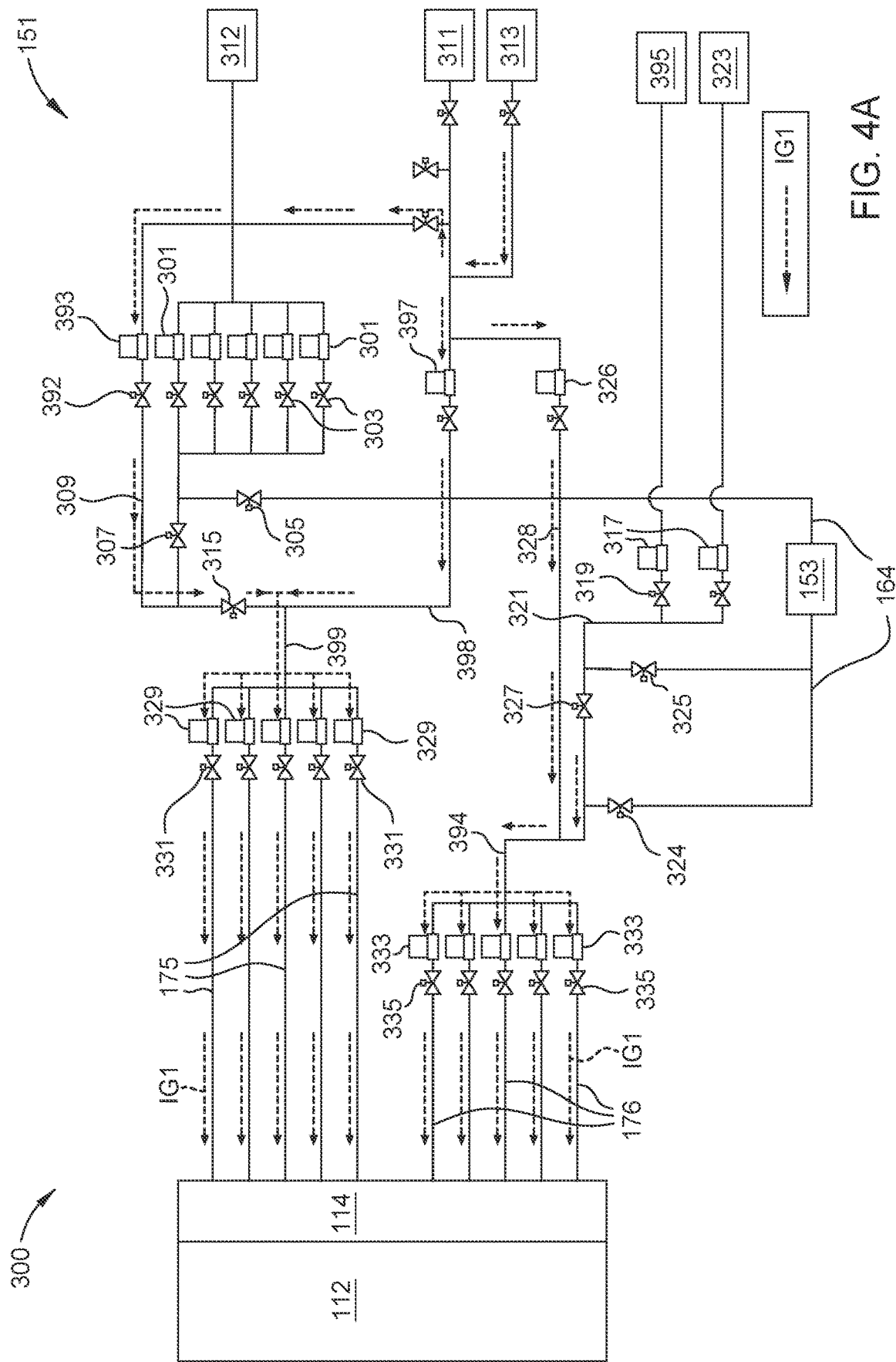
FIG. 4A-4G are schematic diagrams of the gas circuit during a method of substrate processing, according to one or more embodiments.
Figure 4B:
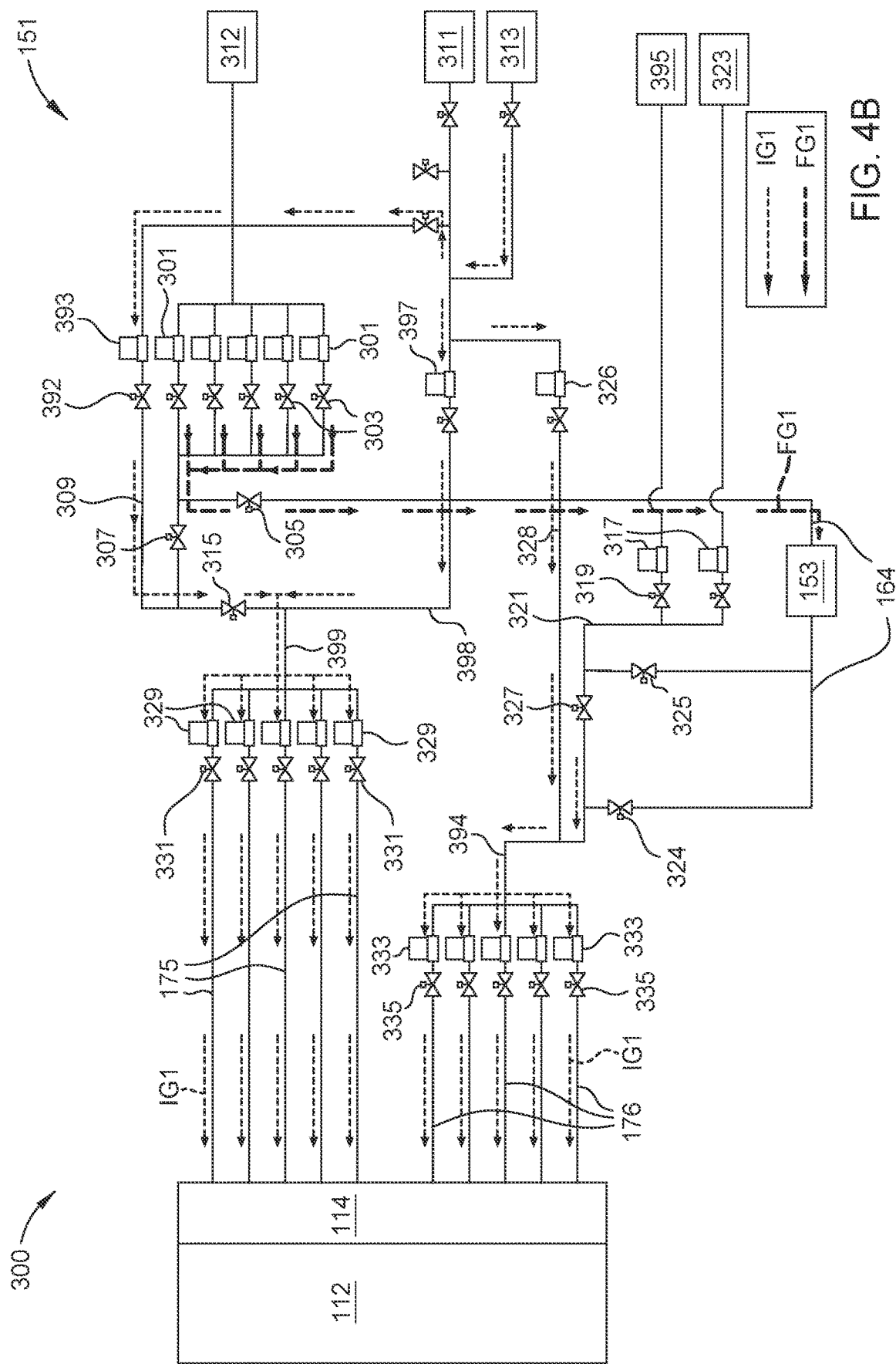
Figure 4C:
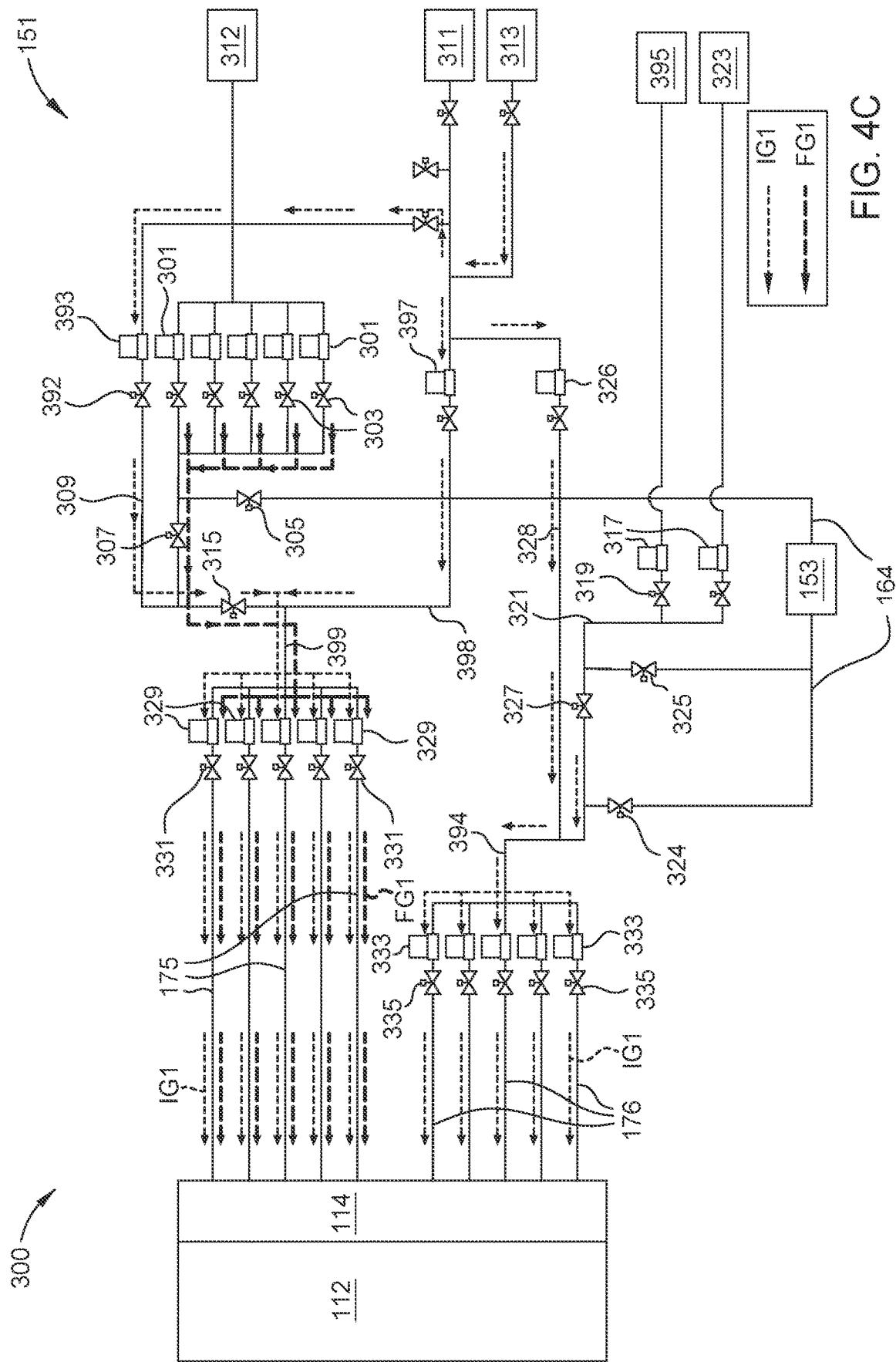
Figure 4D:
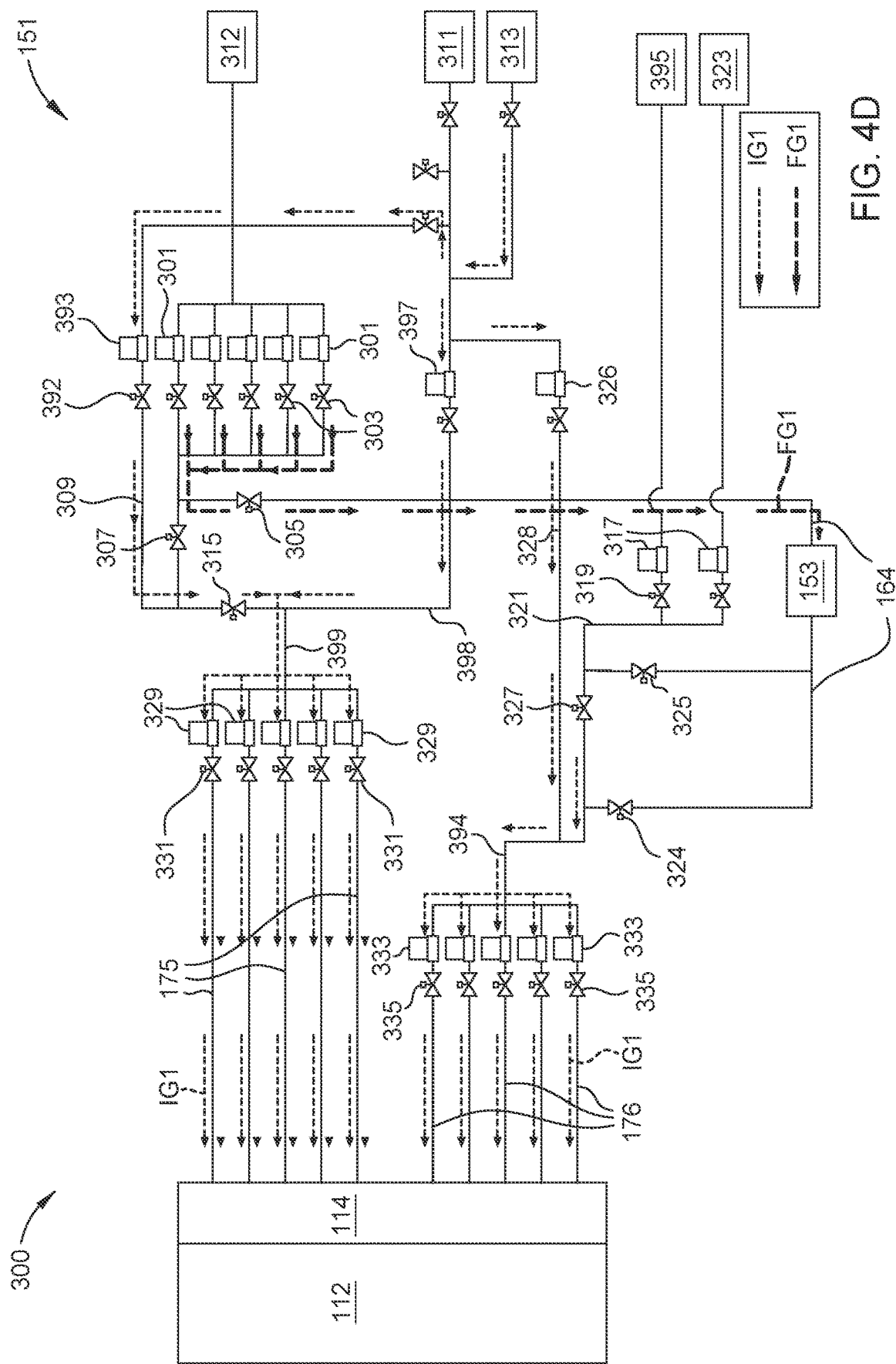
Figure 4E:
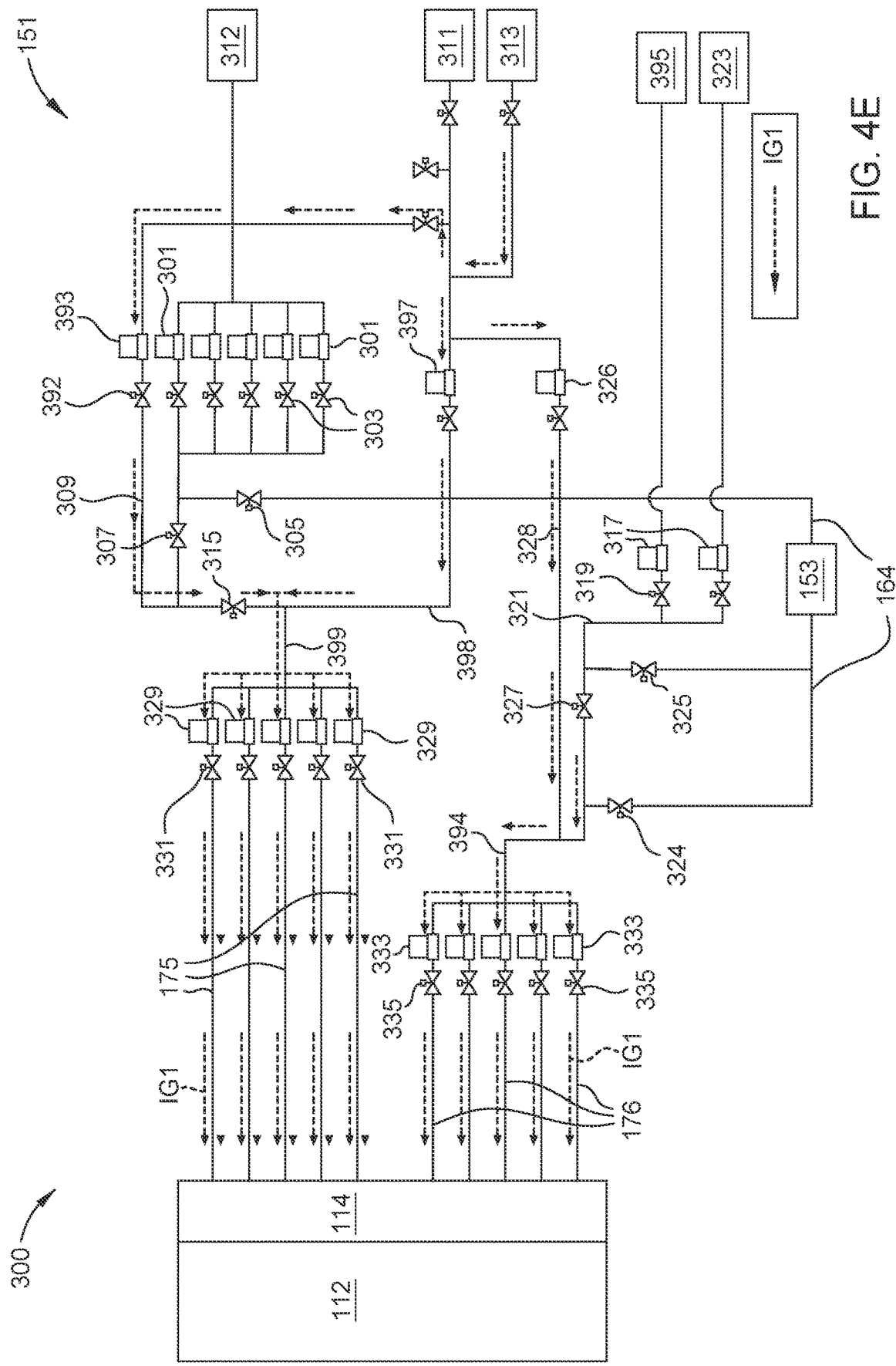
Figure 4F:
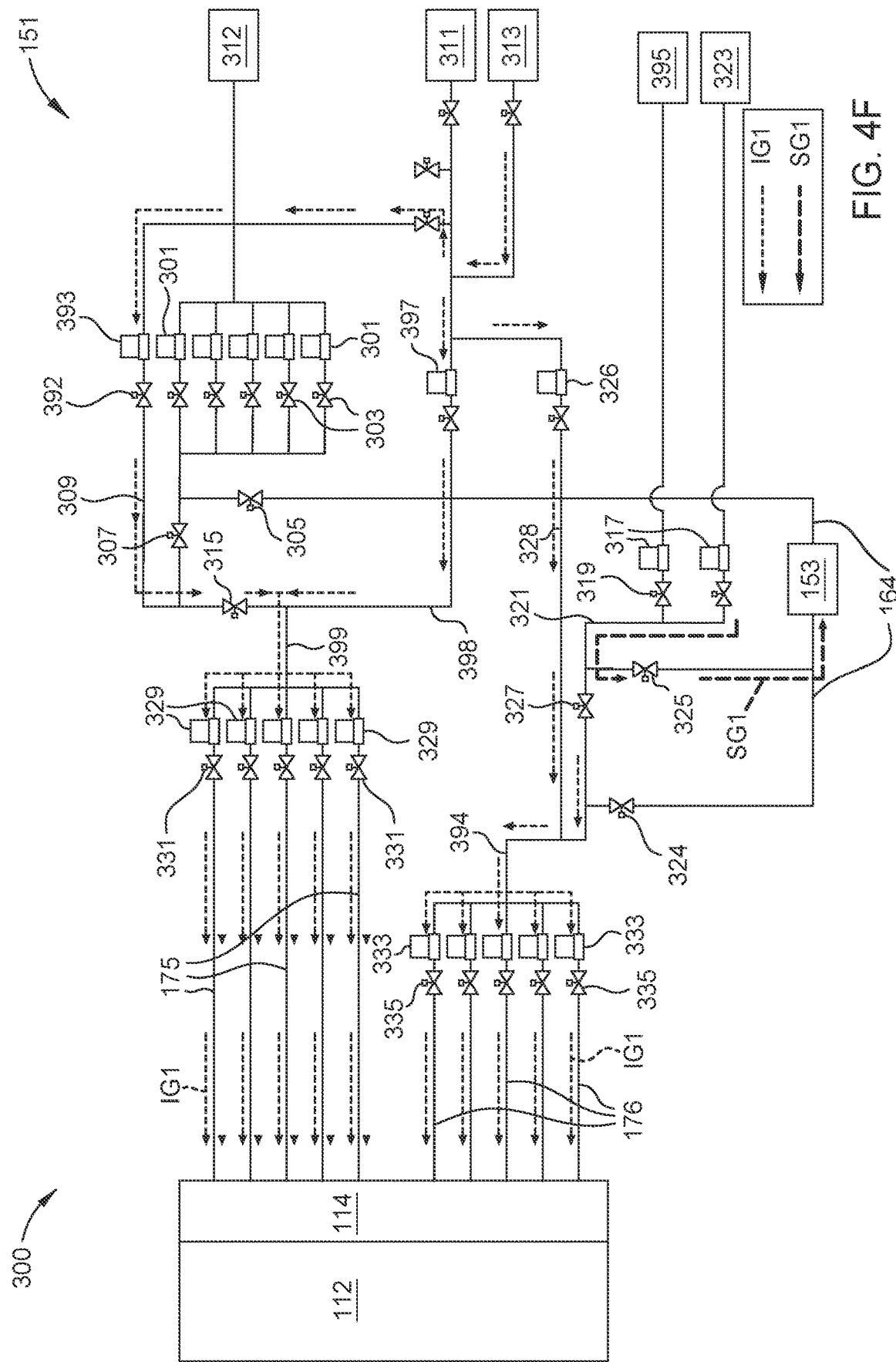
Figure 4G:
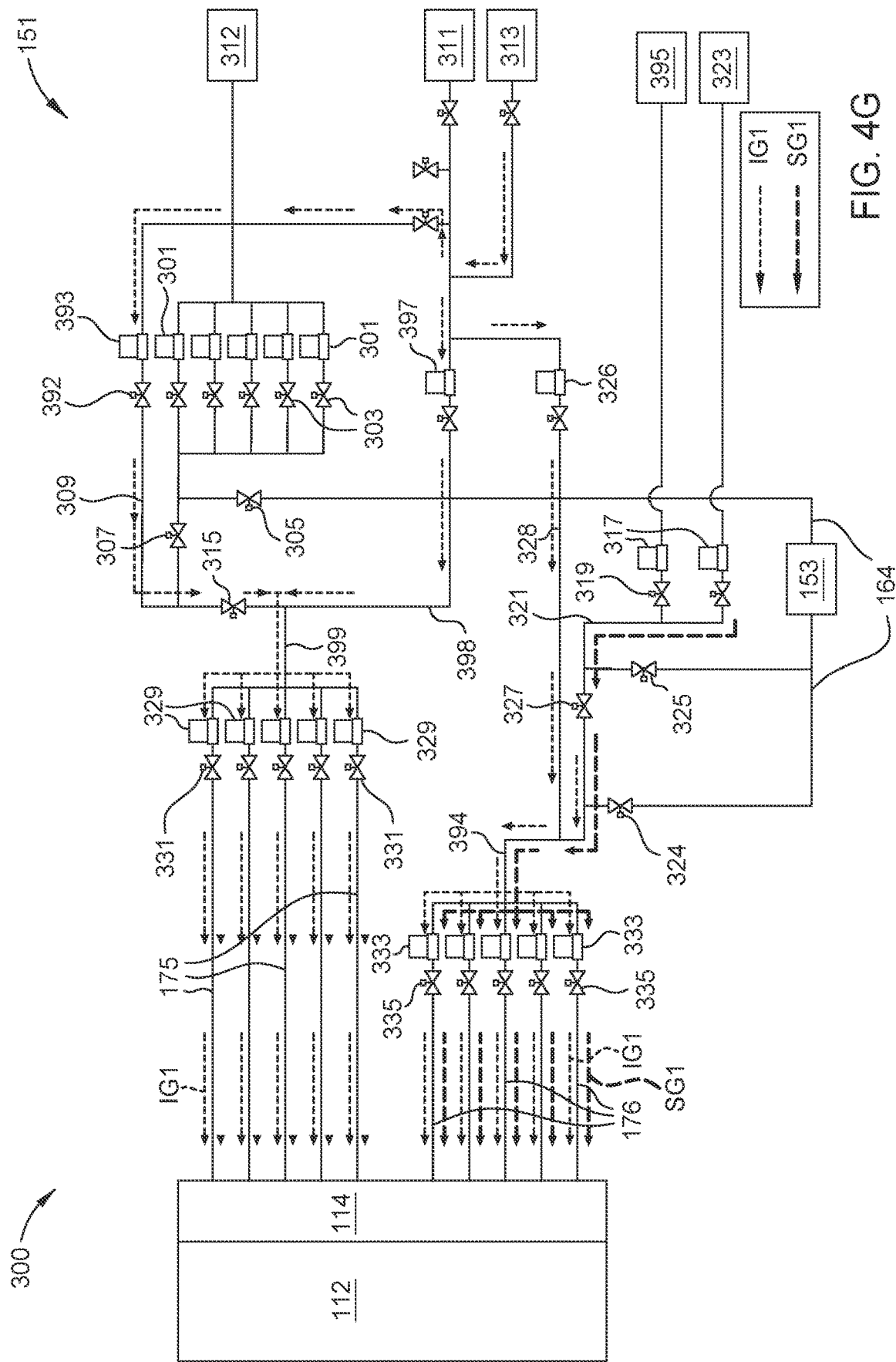
Figure 5:
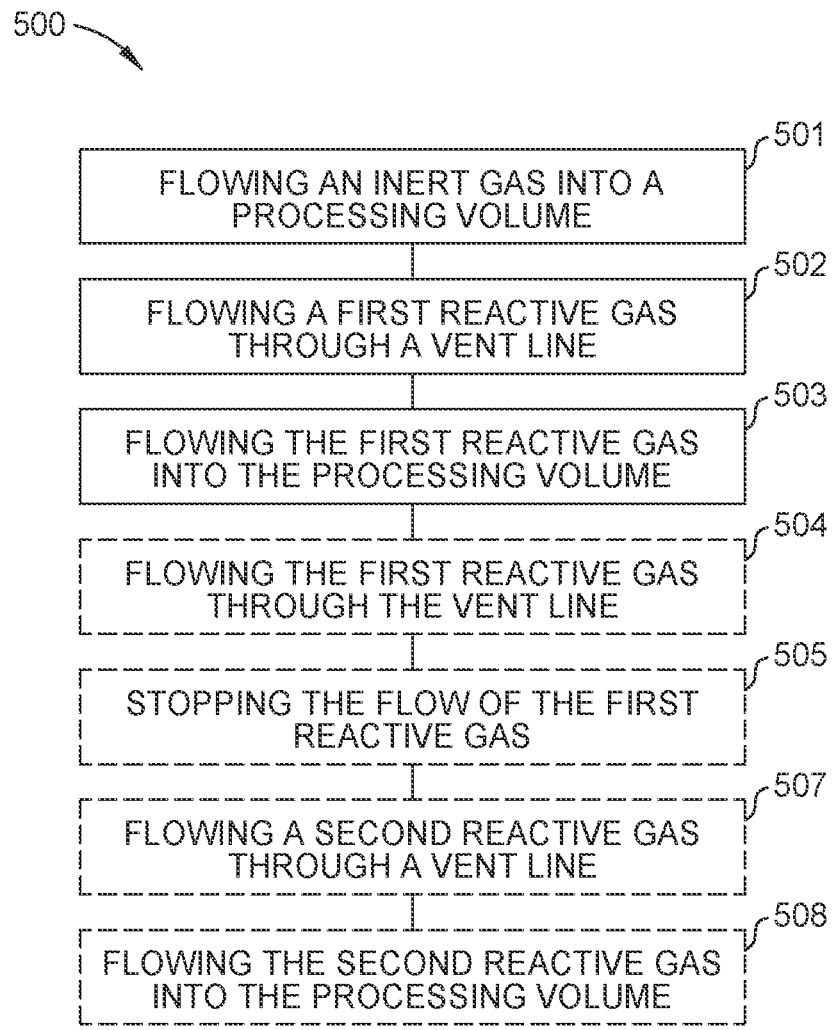
FIG. 5 is a schematic block diagram view of a method including the processes shown in FIGS. 4A-4G, according to one or more embodiments.

The controller 190 is configured to control (such as by calibrating) the deposition, the cleaning, the etching, the rotational position, the heating, and gas flow through the processing chamber 100 by providing an output to the controls for the upper heat sources 141, the lower heat sources 143, the gas panel 151, the motion assembly 121, and the exhaust pump 157 and one or more (such as all) of the valves and flow controllers described for the gas panel 151 in FIGS. 3-5.

The controller 190 is configured to adjust the output to the controls based on the sensor readings, the system model, and the stored readings and calculations. The controller 190 includes embedded software and a compensation algorithm to calibrate measurements. The controller 190 can include one or more machine learning algorithms and/or artificial intelligence algorithms that estimate optimized parameters for the calibration operations, the deposition operations, the etching operations, and/or the cleaning operations. The optimized parameter(s) can include, for example, one or more stabilization conditions and/or one or more flow times associated with reaching the one or more stabilization conditions.

The one or more machine learning algorithms and/or artificial intelligence algorithms may implement, adjust and/or refine one or more algorithms, inputs, outputs or variables described above. Additionally or alternatively, the one or more machine learning algorithms and/or artificial intelligence algorithms may rank or prioritize certain aspects of adjustments of the process chamber 100, the gas circuit 300, the method 500, and/or the method 1000 relative to other aspects of the process chamber 100, the gas circuit 300, the method 500, and/or the method 1000. The one or more machine learning algorithms and/or artificial intelligence algorithms may account for other changes within the processing systems such as hardware replacement and/or degradation. In one or more embodiments, the one or more machine learning algorithms and/or artificial intelligence algorithms account for upstream or downstream changes that may occur in the processing system due to variable changes. For example, if variable "A" is adjusted to cause a change in aspect "B" of the process, and such an adjustment unintentionally causes a change in aspect "C" of the process, then the one or more machine learning algorithms and/or artificial intelligence algorithms may take such a change of aspect "C" into account. In such an embodiment, the one or more machine learning algorithms and/or artificial intelligence algorithms embody predictive aspects related to implementing the process chamber 100, the gas circuit 300, the method 500, and/or the method 1000. The predictive aspects can be utilized to preemptively mitigate unintended changes within a processing system.

The one or more machine learning algorithms and/or artificial intelligence algorithms can use, for example, a regression model (such as a linear regression model) or a clustering technique to estimate optimized parameters. The algorithm can be unsupervised or supervised. The one or more machine learning algorithms and/or artificial intelligence algorithms can optimize, for example, one or more stabilization conditions, one or more flow times, a heating power applied to the heat sources 141, 143, a cleaning recipe, an etching recipe, and/or a deposition recipe.

In one or more embodiments, the controller 190 automatically conducts the operations described herein without the use of one or more machine learning algorithms and/or artificial intelligence algorithms. In one or more embodiments, the controller 190 compares measurements to data in a look-up table and/or a library to calibrate a temperature sensor. The controller 190 can stored measurements as data in the look-up table and/or the library.

FIG. 2 is a schematic top view of the processing chamber 100 shown in FIG. 1, according to one or more embodiments. The injector 112 (shown in FIG. 1) includes a plurality of gas inject passages disposed fluidly between the gas cap 114 and the liner 111. The gas inlets 212 include one or more central gas openings 212a, one or more first outer gas openings 212b on a first side of the one or more central gas openings 212a, and one or more second outer gas openings 212c on a second side of the one or more central gas openings 212a. The gas inlets 212 include one or more first intermediate gas openings 212d between the one or more central gas openings 212a and the one or more first outer gas openings 212b, and one or more second intermediate gas openings 212e between the one or more central gas openings 212a and the outer gas openings 212b, 212c. The one or more first outer gas openings 212b and the one or more second outer gas openings 212c correspond to two edge zones of the substrate.

The gas openings 212a-212e correspond to five flow zones of control and adjustability for the substrate. Different numbers of flow zones (such as two flow zones, three flow zones, or more than five flow zones) are contemplated. As an example, the one or more central gas openings 212a correspond to a center zone of the substrate and the other numbers of flow zones (such as up to ten flow zones or more) are contemplated.

The gas panel 151 is shown connected to the gas cap 114 via the first set of gas lines 175 and the second set of gas lines 176. The first set of gas lines 175 can include, for example, a plurality of pipes. The number of gas lines in the first set of gas lines 175 can correspond to the number of flow zones. Each gas line 175 can supply gas to a respective one of the flow zones. The number of gas lines in the second set of gas lines 176 can correspond to the number of flow zones. Each gas line 176 can supply gas to a respective one of the flow zones. The second set of gas lines 176 can include, for example, a plurality of pipes FIG. 3 is a schematic view of the gas circuit 300 shown in FIG. 1, according to one or more embodiments. The gas circuit 300 includes the gas panel 151, the first set of gas lines 175, the second set of gas lines 176, a plurality of vent lines 164, the vent outlet 153. The gas lines 175, 176 are connected to the injector 112 through the gas cap 114. The gas panel 151 includes a plurality of first supply flow controllers 301. The first supply flow controllers 301 are operable to supply one or more first gases. The first supply flow controllers 301 are connected to a plurality of first supply valves 303 that are operable to allow the first gas to flow or stop the flow of the first gas. A single first supply flow controller 301 or a plurality of first supply flow controllers 301 can be used. The first supply flow controllers 301 are connected by gas lines to a first vent valve 305 and a first isolation valve 307 (e.g., a deposition valve). The first vent valve 305 is connected to the vent line 164 leading to the vent outlet 153. When the first vent valve 305 is open and the first isolation valve 307 is closed, the first gases flow to the vent outlet 153. The first deposition valve 307 is connected to a first main line 399. When the first isolation valve 307 is open and the first vent valve 305 is closed, the first gases flow into the first main line 399 through a second isolation valve 315 (e.g., a second deposition valve). The first carrier gas line 309 is connected to gas sources 311, 313. In one or more embodiments, the gas source 311 supplies a carrier gas, and the gas source 313 supplies a purge gas. The first carrier gas line 309 connects to the second isolation valve 315. When the second isolation valve 315 is open, the first gases and carrier gases flow to the first set of gas lines 175. A bypass gas line 398 bypasses the second deposition valve 315 and flows to the first main line 399. When the second isolation valve 315 is closed, a purge gas and/or a carrier gas can flow to the first set of gas lines 175 through a flow controller 397 and the bypass gas line 398. Alternatively or additionally, the purge gas and/or the carrier gas can flow through the first carrier gas line 309 and to the second isolation valve 315 through a flow controller 393 and a valve 392. The first supply flow controllers 301 are connected to one or more gas sources 312 that supply one or more reactive gases to the first supply flow controllers 301. The present disclosure contemplates that the first vent assembly 1309, the second vent assembly 1311, and the foreline 1313 shown in FIG. 13 can be used in place of the vent outlet 153 and the vent line 164.

One or more second supply flow controllers 317 are disposed in the gas panel 151. The one or more second supply flow controllers 317 are operable to supply a second gas. The second supply flow controllers 317 are connected to one or more second supply valves 319 that are operable to allow the second gas to flow or stop the flow of the second gas. A single second supply flow controller 317 are a plurality of second supply flow controllers 317 can be used. The second supply flow controller 317 is connected to a gas line 321. A gas source 323 is operable to flow a carrier gas and/or purge gas, and a gas source 395 is operable to flow a second reactive gas, such as a cleaning gas and/or an etching gas. The gas source 323 is connected to the gas line 321. A second vent valve 325 and a second isolation valve 327 (e.g., an etching valve or a cleaning valve) are connected to the gas line 321. The second vent valve 325 is connected to the vent outlet 153 via the vent line 164. When the second vent valve 325 is open and the second isolation valve 327 is closed, the second gas flows to the vent outlet 153. The second isolation valve 327 is connected to the second set of gas lines 176. When the second isolation valve 327 is open and the second vent valve 325 is closed, the second gas flows to the second set of gas lines 176.

A flow controller 326 supplies a purge gas to a second main line 394 through a purge gas line 328. The purge gas line 328 bypasses the first isolation valve 327. Purge gases can be flowed through the purge gas line 328 to the second set of gas lines 176 when the second isolation valve 327 is closed. A third vent valve 324 is connected to the gas line 321 past the second isolation valve 327. The third vent valve 324 connects to the vent outlet 153 via the vent line 164.

The first set of gas lines 175 connect to the gas panel 151 and the gas cap 114. A plurality of first ratio flow controllers 329 are connected to the gas lines of the first set of gas lines 175. The first ratio flow controllers 329 monitor and control the flow of gases (e.g., the first gas) flowing to the first set of gas lines 175. A plurality of first ratio flow valves 331 are connected to the first ratio flow controllers 329 to control the flow of the first gas. In one or more embodiments, the first set of gas lines 175 include five gas lines as shown in FIG. 3. In one or more embodiments, as shown in FIG. 3, the first ratio flow controllers 329 are disposed within a panel housing 149 of the gas panel 151. In one or more embodiments, the first ratio flow controllers 329 are disposed outside of the panel housing 149 and along the first set of gas lines 175. In one or more embodiments, the first set of gas lines 175 include two gas lines 175, and two first ratio flow valves 331 and two first ratio flow controllers 329 are respectively connected to the two gas lines 175. Another number of gas lines 175 (such as up to six—or more—gas lines may be used).

The second set of gas lines 176 connect to the gas panel 151 and the gas cap 114. A plurality of second ratio flow controllers 333 are connected to the second set of gas lines 176. The second ratio flow controllers 333 monitor and control the flow of gases (e.g., the second gas). A plurality of second ratio flow valves 335 are connected to the second ratio flow controllers 333 to control the flow of the second gas. In one or more embodiments, the second set of gas lines include five gas lines as shown in FIG. 3. In one or more embodiments as shown in FIG. 3, the second ratio flow controllers 333 are disposed along the second set of gas lines 176 and outside of the panel housing 149 of the gas panel 151. In one or more embodiments, the second ratio flow controllers 333 are disposed within the panel housing 149 of the gas panel 151. In one or more embodiments, the second set of gas lines 176 include two gas lines 176, and two second ratio flow valves 335 and two second ratio flow controllers 333 are respectively connected to the two gas lines 176. Another number of gas lines 176 (such as up to six—or more—gas lines may be used).

FIG. 4A-4G are schematic diagrams of the gas circuit 300 during a method of substrate processing, according to one or more embodiments. The method can include a deposition process, an etching process, and/or a cleaning process.

FIG. 4A shows an inert gas IG1 (e.g., a carrier gas and/or a purge gas) being flowed through the first set of gas lines 175 and the second set of gas lines 176. The first isolation valve 307 and the second isolation valve 327 are closed. The first supply valves 303 and the second supply valves 319 are closed such that The first gas and the second gas do not flow past the supply valves 303, 319 out of the first supply flow controller(s) 301 and the second supply flow controller(s) 317. The inert gas IG1 flows from the gas sources 311, 313 and to the first set of gas lines 175. The inert gas IG1 flows from the gas sources 311, 313 and to the second set of gas lines 176. The inert gas IG1 flows from the first set of gas lines 175 and the second set of gas lines 176 and into the processing chamber 100. The inert gas IG1 functions as a purge gas through the gas lines 175, 176.

FIG. 4B shows a first gas FG1 (e.g., a first reactive gas, such as a deposition gas) being flowed through the vent line 164 to the vent outlet 153 in a stabilization procedure. The inert gas IG1 continues to flow from the first set of gas lines 175 and the second set of gas lines 176 and into the processing chamber 100. The first supply valve(s) 303 and first vent valve 305 are opened. The first gas FG1 flows into the vent outlet 153. The first supply flow controller(s) 301 monitor a first flow rate of the first gas FG1. The first gas FG1 flows into the vent outlet 153 until a stabilization condition is met. In one or more embodiments, the stabilization condition includes pressurizing the processing volume 136 to a target pressure. In one or more embodiments, the stabilization condition includes achieving the first flow rate of the first gas, and maintaining the first flow rate within a first range for a first time period. The first range is a deviation above and below the first flow rate, which can be pre-selected. In one or more embodiments, the first range is 95% to 105% of the first flow rate. In one or more embodiments, the first range is 99% to 101% of the first flow rate. Other values are contemplated for the first range. In one or more embodiments, the first time period is 1 second or less, such as within a range of 0.05 seconds to 1 second, for example within a range of 0.1 seconds to 1 second. In one or more embodiments, the first time period is greater than 1 second, such as within a range of 10 seconds to 20 seconds (or higher). Other values are contemplated for the first time period. When the stabilization condition is met, the flow of the first gas FG1 is switched (as shown in FIG. 4C).

FIG. 4C shows the flow of the first gas FG1 as switched to flow into the processing chamber 100 through the first set of gas lines 175. As part of the switching, the first vent valve 305 is closed and the first isolation valve 307 is opened. The present disclosure contemplates that the continued flow of the inert gas IG1 can function as a carrier gas for the first gas FG1, and both the inert gas IG1 and the first FG1 flow through the first set of gas lines 175 and into the processing chamber 100. The first ratio flow controllers 329 monitor the flow of the first gas FG1 and the inert gas IG1, and control the ratios of the first gas FG1 and inert gas IG1 supplied to the respective gas lines 175. The first gas FG1 and the inert gas IG1 enter the processing volume 136 through the gas openings 212a-212e and are used to perform a deposition process on the substrate 102.

FIG. 4D shows the first gas FG1 being flowed through the vent line 164 and to the vent outlet 153 in a second stabilization procedure. After the deposition process is completed, the first isolation valve 307 is closed and the first vent valve 305 is opened. The first gas FG1 is flowed into the vent outlet 153 until a second stabilization condition is met. When the second stabilization condition is met, the first supply valves 303 are closed. In one or more embodiments, the second stabilization condition includes pressurizing the processing volume 136 to a target pressure. In one or more embodiments, the second stabilization condition includes achieving a second flow rate of the first gas, and maintaining the second flow rate within a second range for a second time period. The second range is a deviation above and below the second flow rate, which can be pre-selected. In one or more embodiments, the second range is 95% to 105% of the second flow rate. In one or more embodiments, the second range is 99% to 101% of the second flow rate. Other values are contemplated for the second range. In one or more embodiments, the second time period is 1 second or less, such as within a range of 0.05 seconds to 1 second, for example within a range of 0.1 seconds to 1 second. In one or more embodiments, the second time period is greater than 1 second, such as within a range of 10 seconds to 20 seconds (or higher). Other values are contemplated for the second time period. In one or more embodiments, the second flow rate is different than (e.g., more than or less than) the first flow rate.

FIG. 4E shows the inert gas IG1 being flowed through the first set of gas lines 175 and the second set of gas lines 176. The gas circuit 300 can be in the same operable condition as shown in FIG. 4A.

FIG. 4F shows a second gas SG1 (e.g., a second reactive gas, such as a etching gas and/or a cleaning gas) being flowed through the vent line 164 to the vent outlet 153 in a third stabilization procedure. The present disclosure contemplates that the second gas SG1 can be a second deposition gas that has a different composition than the first gas FG1. The inert gas IG1 continues to flow from the first set of gas lines 175 and the second set of gas lines 176 and into the processing chamber 100. The second supply valve(s) 319 are opened. The second vent valve 325 is opened and the second isolation valve 327 is closed. The second gas SG1 flows into the vent outlet 153. The second supply flow controller(s) 317 monitor a second flow rate of the second gas SG1. The second gas SG1 flows into the vent outlet 153 until a third stabilization condition is met. In one or more embodiments, the third stabilization condition includes pressurizing the processing volume 136 to a target pressure. In one or more embodiments, the third stabilization condition includes achieving a third flow rate of the second gas SG1, and maintaining the third flow rate within a third range for a third time period. The third range is a deviation above and below the third flow rate, which can be pre-selected. In one or more embodiments, the third range is 95% to 105% of the third flow rate. In one or more embodiments, the third range is 99% to 101% of the third flow rate. Other values are contemplated for the third range. In one or more embodiments, the third time period is 1 second or less, such as within a range of 0.05 seconds to 1 second, for example within a range of 0.1 seconds to 1 second. In one or more embodiments, the third time period is greater than 1 second, such as within a range of 10 seconds to 20 seconds (or higher). Other values are contemplated for the third time period. When the stabilization condition is met, the flow of the second gas SG1 is switched (as shown in FIG. 4G).

FIG. 4G shows the second gas SG1 as switched to flow into the processing chamber 100 through the second set of gas lines 176. The second vent valve 325 is closed and the second isolation valve 327 is opened. The inert gas IG1 can function as a carrier gas for the second gas SG1, and the inert gas IG1 and the second gas SG1 flow through the second set of gas lines 176 and into the processing chamber 100. The second ratio flow controllers 333 monitor the flow of the second gas SG1 and the inert gas IG1, and control the ratios of the second gas SG1 and inert gas IG1 supplied to the respective gas lines 176. The second gas SG1 and the inert gas IG1 enter the processing volume 136 through the gas openings 212a-212e and are used to perform an etching process on the substrate 102 and/or a cleaning operation on the processing chamber 100.

After the etching process and/or the cleaning process is completed, in one or more embodiments, the second gas SG1 may undergo a fourth stabilization procedure and then be turned off by closing the second supply valve(s) 319 when a fourth stabilization condition is met. The inert gas IG1 can then function as a purge gas through both of the gas lines 175, 176. In one or more embodiments, the third stabilization condition includes pressurizing the processing volume 136 to a target pressure. In one or more embodiments, the fourth stabilization condition includes achieving a fourth flow rate of the second gas SG1, and maintaining the fourth flow rate within a fourth range for a fourth time period. The fourth range is a deviation above and below the fourth flow rate, which can be pre-selected. In one or more embodiments, the fourth range is 95% to 105% of the fourth flow rate. In one or more embodiments, the fourth range is 99% to 101% of the fourth flow rate. Other values are contemplated for the fourth range. In one or more embodiments, the fourth time period is 1 second or less, such as within a range of 0.05 seconds to 1 second, for example within a range of 0.1 seconds to 1 second. In one or more embodiments, the fourth time period is greater than 1 second, such as within a range of 10 seconds to 20 seconds (or higher). Other values are contemplated for the fourth time period. In one or more embodiments, the fourth flow rate is different than (e.g., more than or less than) the third flow rate. After a period of time the flow of inert gas IG1 can be turned off.

As shown in FIGS. 3 and 4A-4G, reactive gases (such as the first gas FG1 and the second gas SG1) are stabilized prior to flowing to upstream sides of the respective first ratio flow controllers 329 or second ratio flow controllers 333. In one or more embodiments, the first gas FG1 and the second gas SG1 are supplied to the processing chamber 100 respectively through the first set of gas lines 175 and the second set of gas lines 176 that are fluidly separate from each other.

FIG. 5 is a schematic block diagram view of a method 500 including the processes shown in FIGS. 4A-4G, according to one or more embodiments.

At operation 501, an inert gas is flowed into a processing volume 136. The inert gas is flowed into the first set of gas lines 175 and the second set of gas lines 176. Operation 501 is further described with FIG. 4A.

At operation 502, a first reactive gas is flowed through a vent line 164. The first reactive gas is then stabilized to meet the stabilization condition. Operation 502 is further described with FIG. 4B.

At operation 503, the first reactive gas is switched to flow into the processing volume 136. In one or more embodiments, the first reactive gas performs a deposition process on the substrate 102. Operation 503 is further described with FIG. 4C.

At optional operation 504, the first reactive gas is flowed through the vent line 164. The flow rate of the first reactive gas is then stabilized according to the second stabilization condition. Operation 504 is further described with FIG. 4D.

At optional operation 505, the flow of the first reactive gas is stopped. After the stabilization of operation 504, the first reactive gas is turned off at the first supply valve(s) 303. Operation 505 is further described with FIG. 4D.

At optional operation 507, a second reactive gas is flowed through a vent line 164. The second reactive gas is then stabilized according to the third stabilization condition. Operation 507 is further described with FIG. 4F.

At optional operation 508, the second reactive gas is switched to flow into the processing volume 136. The second reactive gas performs an etching process on the substrate 102 and/or a cleaning process on the processing chamber 100. Operation 508 is further described with FIG. 4G.

The present disclosure contemplates that the inert gas can continue to flow into the processing volume 136 throughout one or more (such as one or all) of operations 502, 503, 504, 505, 507, and/or 508.

Figure 6:
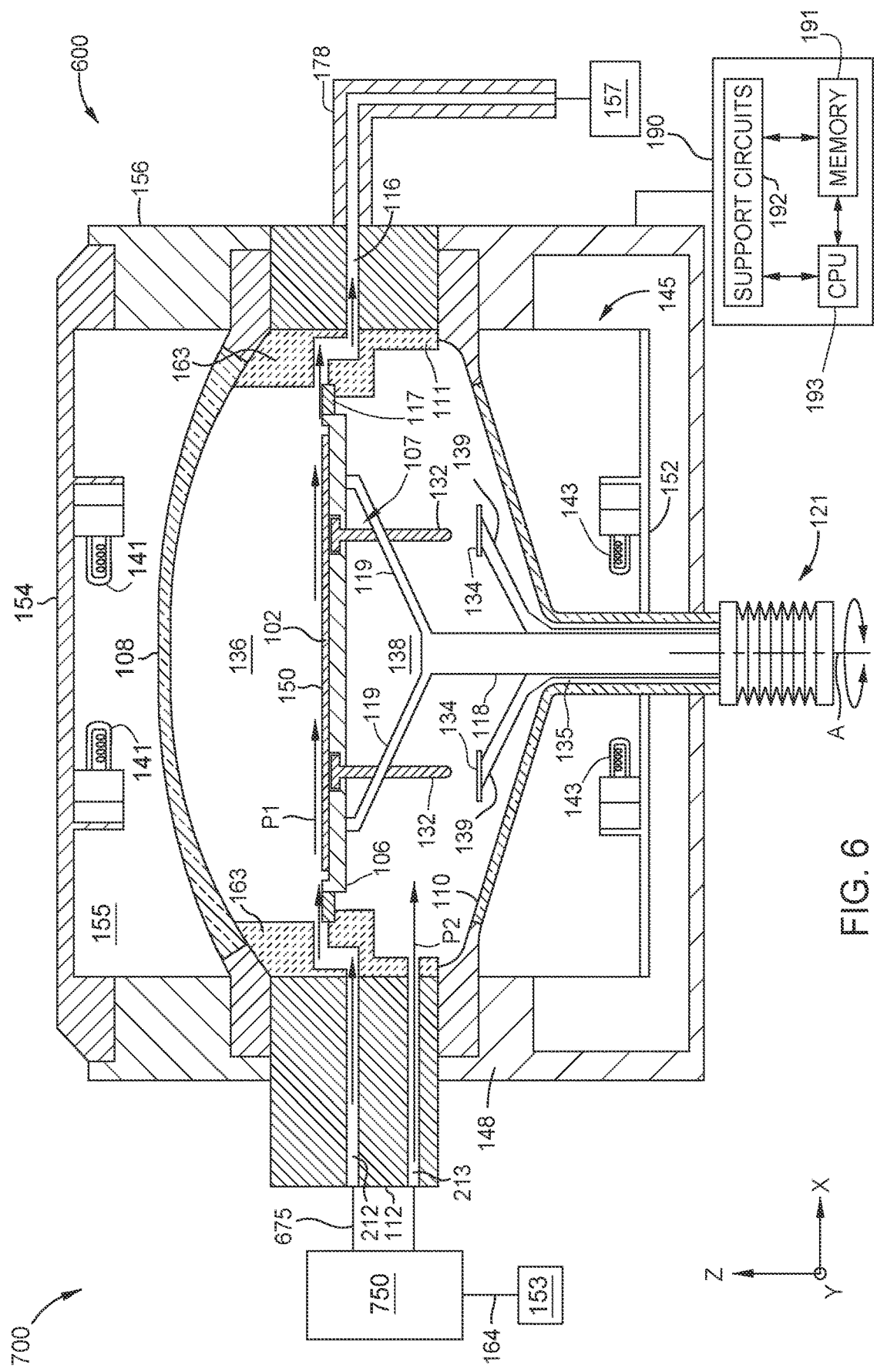
FIG. 6 is a schematic side view of a processing chamber with a gas circuit, according to one or more embodiments.
Figure 7A:
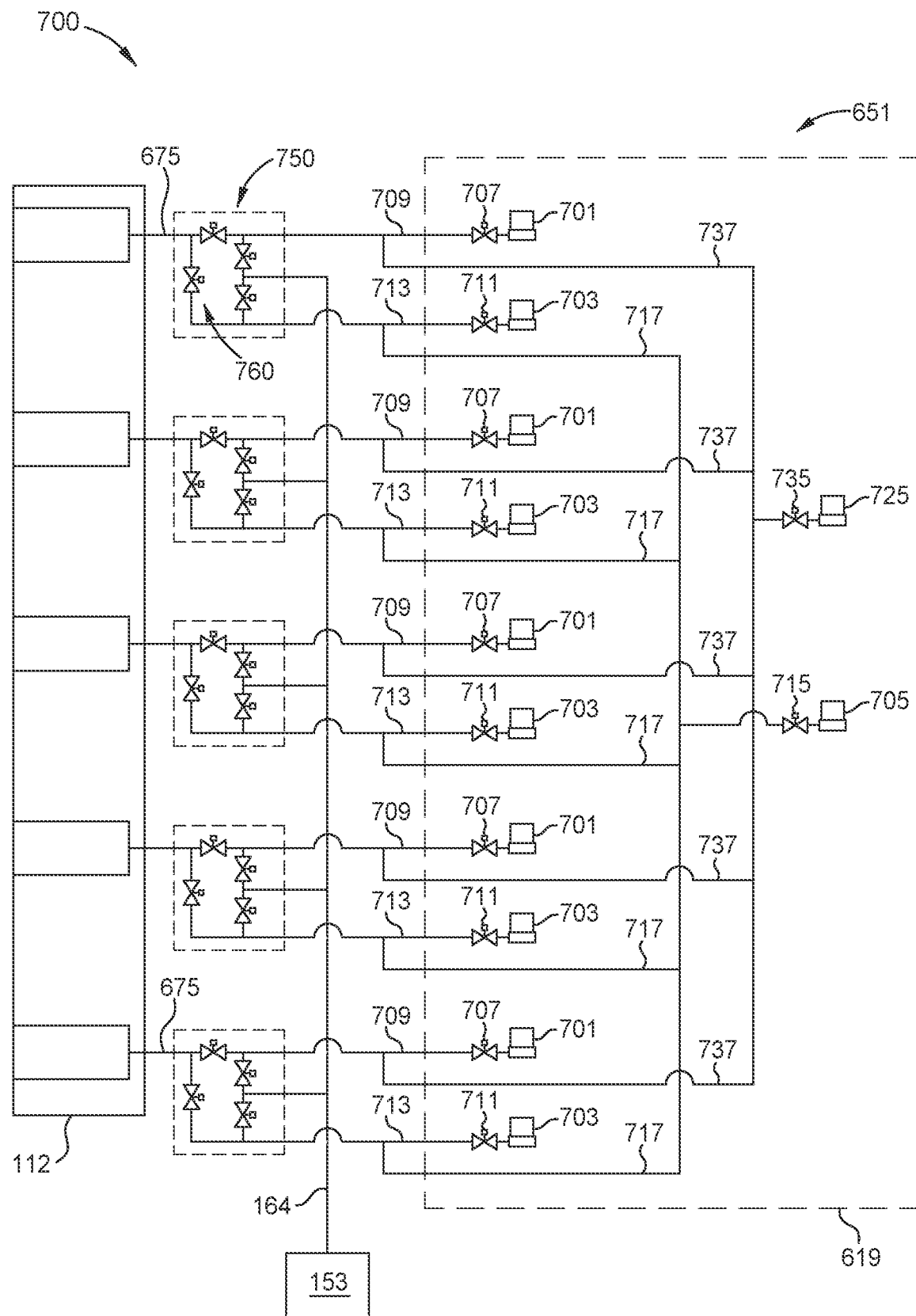
FIG. 7A is a schematic partial view of the gas circuit shown in FIG. 6, according to one or more embodiments.

FIG. 6 is a schematic side view of a processing chamber 600 with a gas circuit 700, according to one or more embodiments. The processing chamber 600 shares the features of the processing chamber 100 with a different gas circuit as gas circuit 700. The gas circuit 700 can be used in place of or can be combined with the gas circuit 300. The processing chamber 600 can omit the gas cap 114 shown in FIG. 1. The gas circuit 700 includes a plurality valve assemblies 750 connected to the injector 112 by a plurality of gas lines 675 (five are shown in FIG. 7A). The valve assemblies can be connected to a gas panel 651. A different number of gas lines 675 can be used. In one or more embodiments, the gas circuit 700 includes two gas lines 675. The valve assemblies 750 are connected to the vent outlet 153 via the vent line 164. The gas circuit 700 is further described in FIG. 7A-7C.

FIG. 7A is a schematic partial view of the gas circuit 700 shown in FIG. 6, according to one or more embodiments. The gas panel 151 includes a plurality of first flow controllers 701 (five are shown), a plurality of second flow controllers 703 (five are shown), and a plurality of supply valves. The plurality of supply valves include a plurality of first supply valves 707 and a plurality of second supply valves 711. The plurality of first flow controllers 701 are connected to the first supply valves 707. The first supply valves 707 are connected to first supply lines 709. The first flow controllers 701 supply the first gas FG1. The first supply valves 707 can stop the flow of the first gas FG1 from the first flow controllers 701 to the first supply lines 709. The first supply lines 709 extend out of a panel housing 619 of the gas panel 651, and away from the first flow controllers 701. A different number of first flow controllers 701 and second flow controllers 703 can be used. In one or more embodiments, the gas circuit 700 includes two first flow controllers 701 and two second flow controllers 703.

The present disclosure contemplates that valves described herein can be disposed downstream of, upstream of, or both downstream and upstream of associated flow controllers. For example, in FIG. 7A the first supply valves 707 are shown as downstream of the first flow controllers 701 and the second supply valves 711 are shown as downstream of the second flow controllers 703. The present disclosure contemplates that the first supply valves 707 can be disposed upstream of the first flow controllers 701 and/or the second supply valves 711 can be disposed upstream of the second flow controllers 703. The present disclosure also contemplates that the first supply valves 707 can include sets of first supply valves disposed both downstream and upstream of the first flow controllers 701, and/or the second supply valves 711 can include sets of second supply valves disposed both downstream and upstream of the second flow controllers 703.

The plurality of second flow controllers 703 are connected to the second supply valves 711. The second supply valves 711 are connected to second supply lines 713. The second flow controllers 703 supply the second gas SG1. The second supply valves 711 can stop the flow of second gas from the second supply flow controllers 703 to the second supply lines 713. The second gas lines 711 extend out of the gas panel 651. The plurality of supply valves 707, 711 are operable to open and close the respective flow of the first gas and the second gas received from the one or more first flow controllers 701 and the one or more second flow controllers 703.

A first inert flow controller 725 is connected to a first inert valve 735, and the first inert valve 735 is connected to first inert lines 737. The first inert flow controller 725 supplies inert gas to the first supply lines 709 through the first inert lines 737. The first inert valve 735 can stop the flow of inert gas from the first inert flow controller 725 to the first inert lines 737. The present disclosure contemplates that the first inert flow controller 725, the first inert valve 735, and the first inert lines 737 can be omitted, and the inert gas IG1 can be supplied through the one or more first flow controllers 701.

A second inert flow controller 705 is connected to a second inert valve 715. The second inert valve 715 is connected to second inert lines 717. The second supply controller 705 supplies inert gas to the second supply lines 713 through the second inert lines 717. The second inert valve 715 can stop the flow of inert gas from the second inert flow controller 705 to the second inert lines 717.

The first inert lines 737 and/or the second inert lines 717 can extend out of the panel housing 619 of the gas panel 651. In one or more embodiments, the first inert lines 737 connect to the first supply lines 709 outside of the panel housing 619 of the gas panel 651, and/or the second inert lines 717 connect to the second supply lines 713 outside of the panel housing 619 of the gas panel 651. In one or more embodiments, the inert lines 717, 737 connect to the supply lines 709, 713 within the panel housing 619 of the gas panel 651.

The first supply lines 709 and the second supply lines 713 connect to one or more valve assembles 750 (a plurality is shown). Five valve assemblies 750 are shown in FIG. 7A. As described above for the gas lines 675, the first flow controllers 701, and the second flow controllers 703, a different number of valve assemblies 750 can be used. In one or more embodiments, the gas circuit 700 includes two valve assemblies 750. The valve assemblies 750 connect to the vent outlet 153 via the vent lines 164. The one or more valve assemblies are connected, respectively, between one or more gas lines 675 on one side and the one or more first flow controllers 701 and the one or more second flow controllers 703 on another side. The plurality of gas lines 675 connect to the injector 112. The valve assemblies 750 control which gases reach the plurality of gas lines using a plurality of valves 760. The valve assembly 750 is further described with FIG. 7B.

Figure 7B:
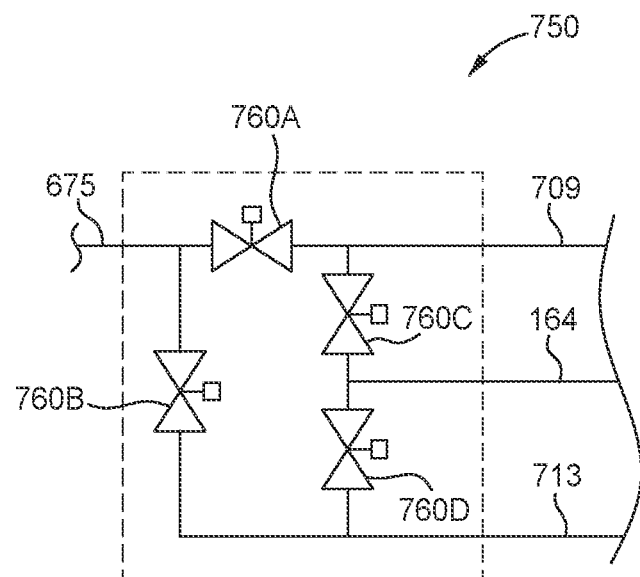
FIG. 7B is a schematic view of one of the valve assemblies of the gas circuit shown in FIG. 7A, according to one or more embodiments.

FIG. 7B is a schematic view of one of the valve assemblies 750 of the gas circuit 700 shown in FIG. 7A, according to one or more embodiments. A first valve 760A controls the flow of the first gas and/or inert gas to the gas lines 675 that is received from the first supply line 709. A second valve 760B controls the flow of the second gas and/or inert gas to the gas lines 675 that is received from the second supply line 713. A first vent valve 760C controls the flow of the first gas to the vent outlet 153. A second vent valve 760D controls the flow of the second gas to the vent outlet 153. The first valve 760A is operable to flow the first gas and/or inert gas to the one or more gas lines 675 when open. The first vent valve 760C is operable to flow the first gas to the vent line 164 when open, and when the first valve 760A is closed. The second valve 760B is operable to flow the second gas to the one or more gas lines 675 when open. The second vent valve 760D is operable to flow the second gas to the vent line 164 when open, and when the second valve 760B and the first vent valve 760C are closed. In one or more embodiments, the second valve 760B and the first vent valve 760C are disposed in parallel. Other orientations are contemplated for the valves 760A-760D.

In one or more embodiments, if a power outage is detected, the flow of the first gas FG1 and the flow of the second gas SG1 (if either is on) are turned off, the inert gas IG1 flowing through the first supply line 709 flows to the processing volume 136 by opening the first valve 760A (and closing the first vent valve 760C). Also, the inert gas IG1 flowing through the second supply line 713 flows to the vent line 164 by opening the second vent valve 760D (and closing the second valve 760B).

Figure 7C:
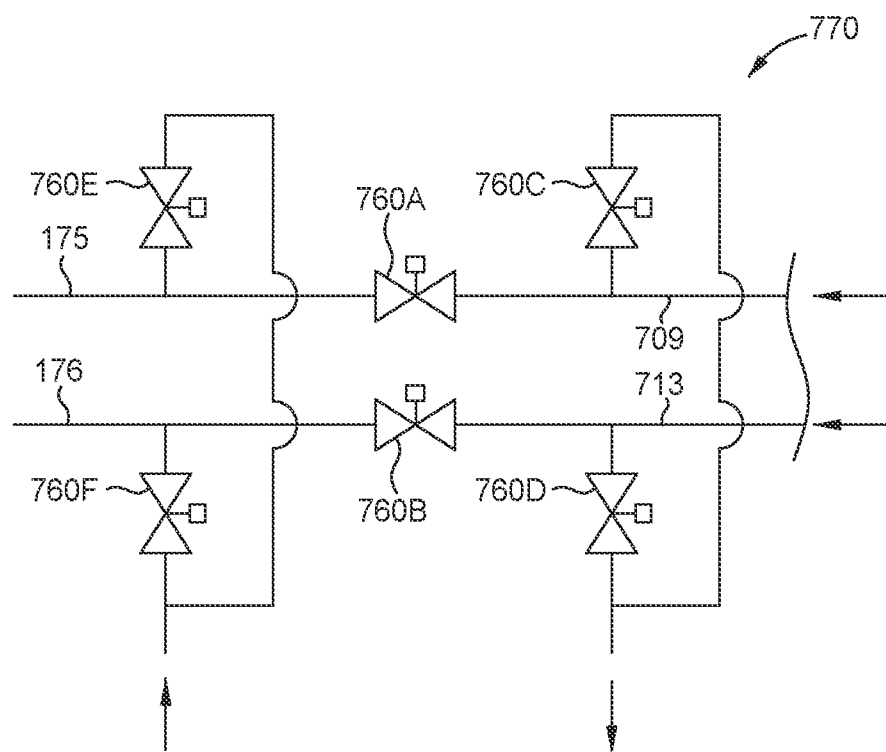
FIG. 7C is a schematic view of a valve assembly, according to one or more embodiments.

FIG. 7C is a schematic view of a valve assembly 770, according to one or more embodiments. The valve assembly 770 can be used in place of one or more of the one or more valve assemblies 750 shown in FIG. 7A. The valve assembly 750 shown in FIG. 7B includes four valves 760A-760D. The valve assembly 770 includes six valves 760A-760F. A first inert valve 760E supplies inert gas to one of the first set of gas lines 175 downstream of the first valve 760A, and a second inert valve 760F supplies inert gas to one of the second set of gas lines 176 downstream of the second valve 760B. In implementation of the valve assembly 750 shown in FIG. 7B, the inert gas is supplied to the first and second supply lines 709, 713 on an upstream side of the first and second valves 760A, 760B.

Figure 8:
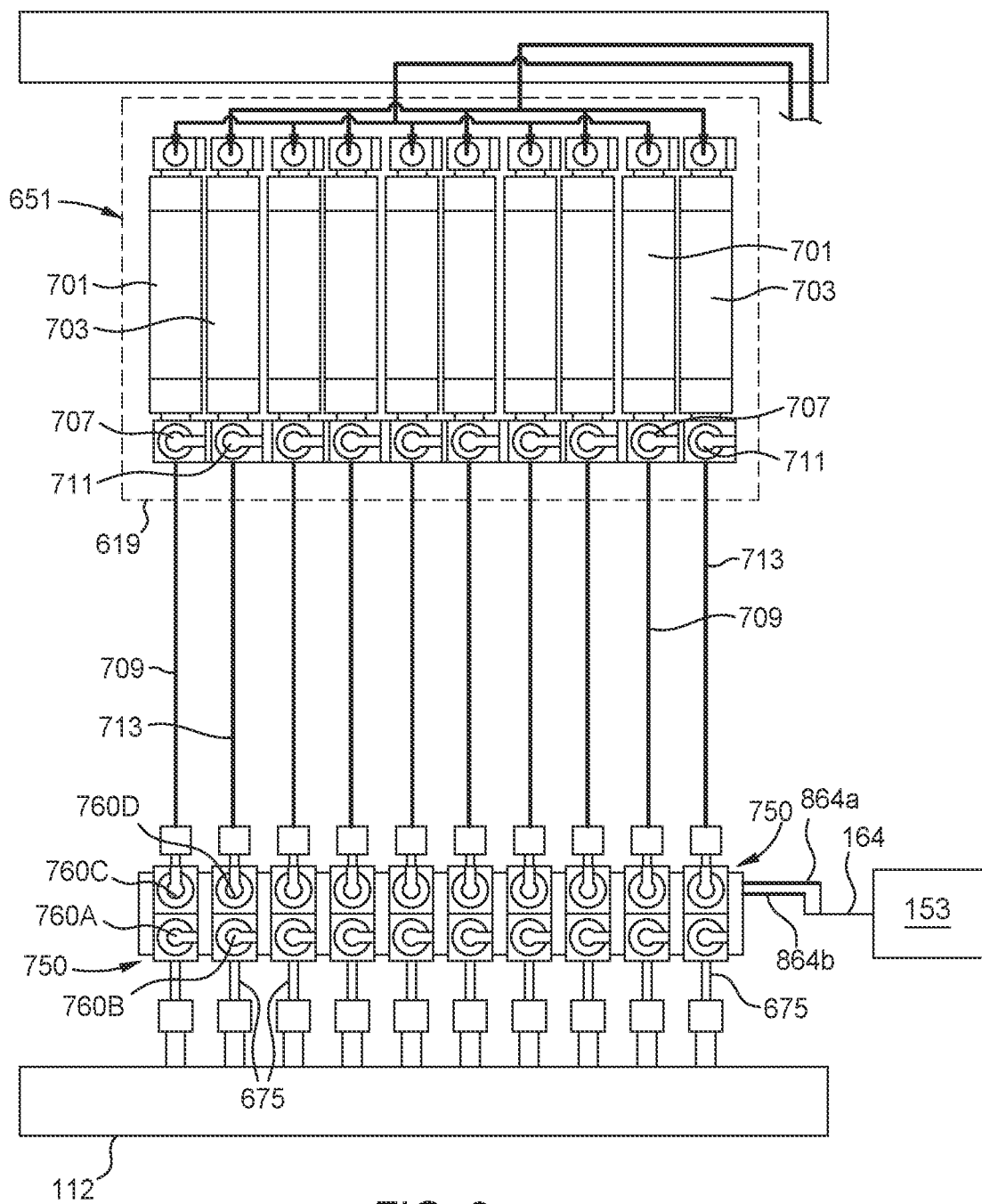
FIG. 8 is a schematic side view of the gas circuit when connected to the injector, according to one or more embodiments.

FIG. 8 is a schematic side view of the gas circuit 700 when connected to the injector 112, according to one or more embodiments. FIG. 8 shows the orientation of the gas circuit installed in the processing chamber 100. In one or more embodiments, the gas lines 675 connect to the injector 112 from above the injector 112. In one or more embodiments, the first and second flow controllers 701, 703 are coupled together in an alternating arrangement. In one or more embodiments, the first and second supply valves 707, 711 are coupled together in an alternating arrangement. In one or more embodiments, the one or more valve assemblies 750 are coupled together. In one or more embodiments, the vent line 164 connects to a first subline 864a that vents the first gas FG1, and a second subline 864b that vents the second gas SG1.

FIGS. 9A-9G are schematic partial views of the gas circuit 700 during a method of substrate processing, according to one or more embodiments. The method can include a deposition process, an etching process, and/or a cleaning process.

Figure 9A:
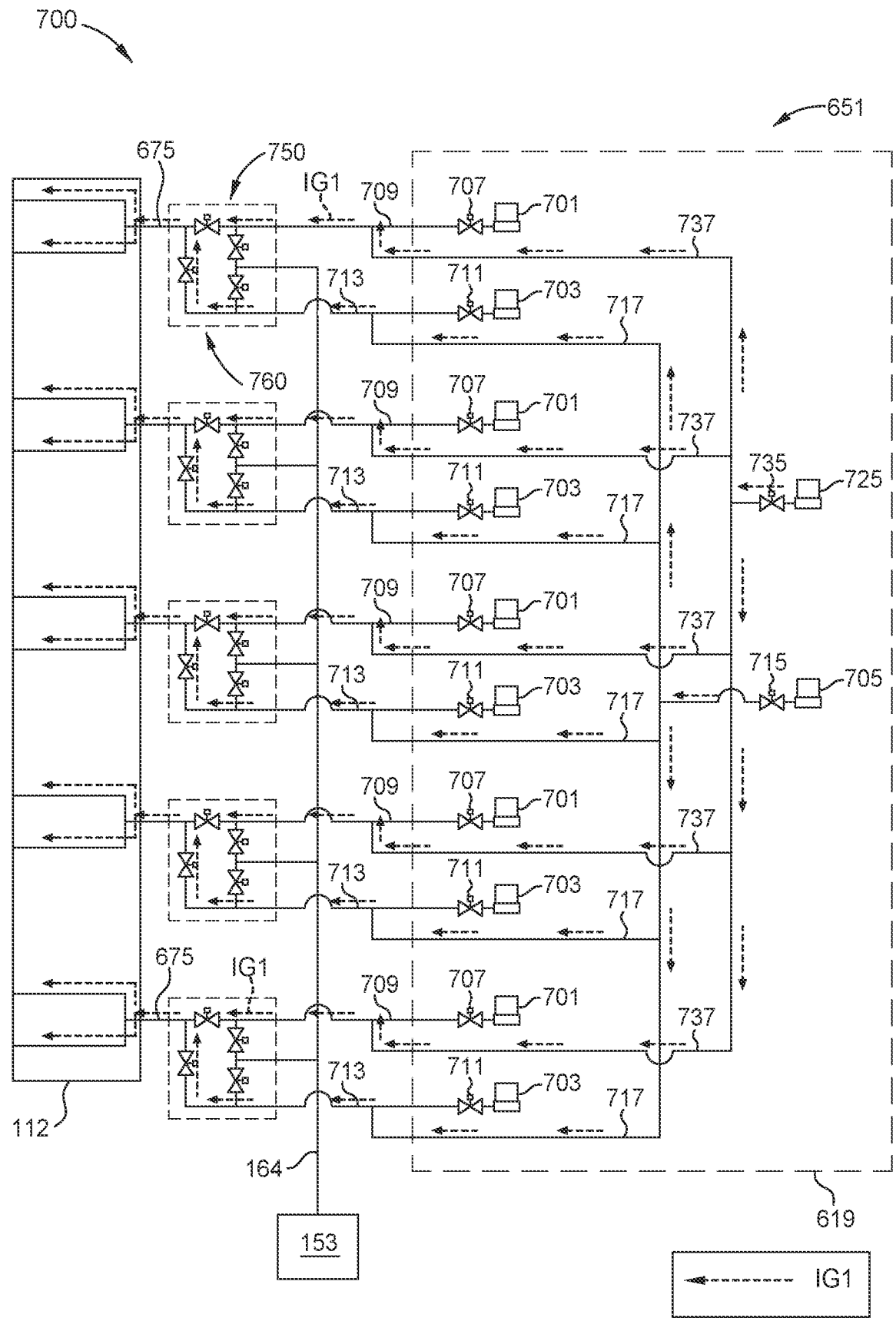
FIGS. 9A-9G are schematic partial views of the gas circuit during a method of substrate processing, according to one or more embodiments.

FIG. 9A shows the inert gas IG1 being flowed through the gas lines 675. The inert gas IG1 is supplied from the first inert flow controller 725 and the second inert flow controller 705. The first valves 760A and the second valves 760B are open, and the first vent valves 760C and the second vent valves 760D are closed. The inert gas IG1 flows through the first valves 760A and the second valves 760B to the gas lines 176. The inert gas IG1 flows into the processing volume 136. The first and second flow valves 707, 711 are closed. The first gas and the second gas do not flow out of the first flow controllers 701 and the second supply flow controller 703 past the supply valves 707, 711.

Figure 9B:
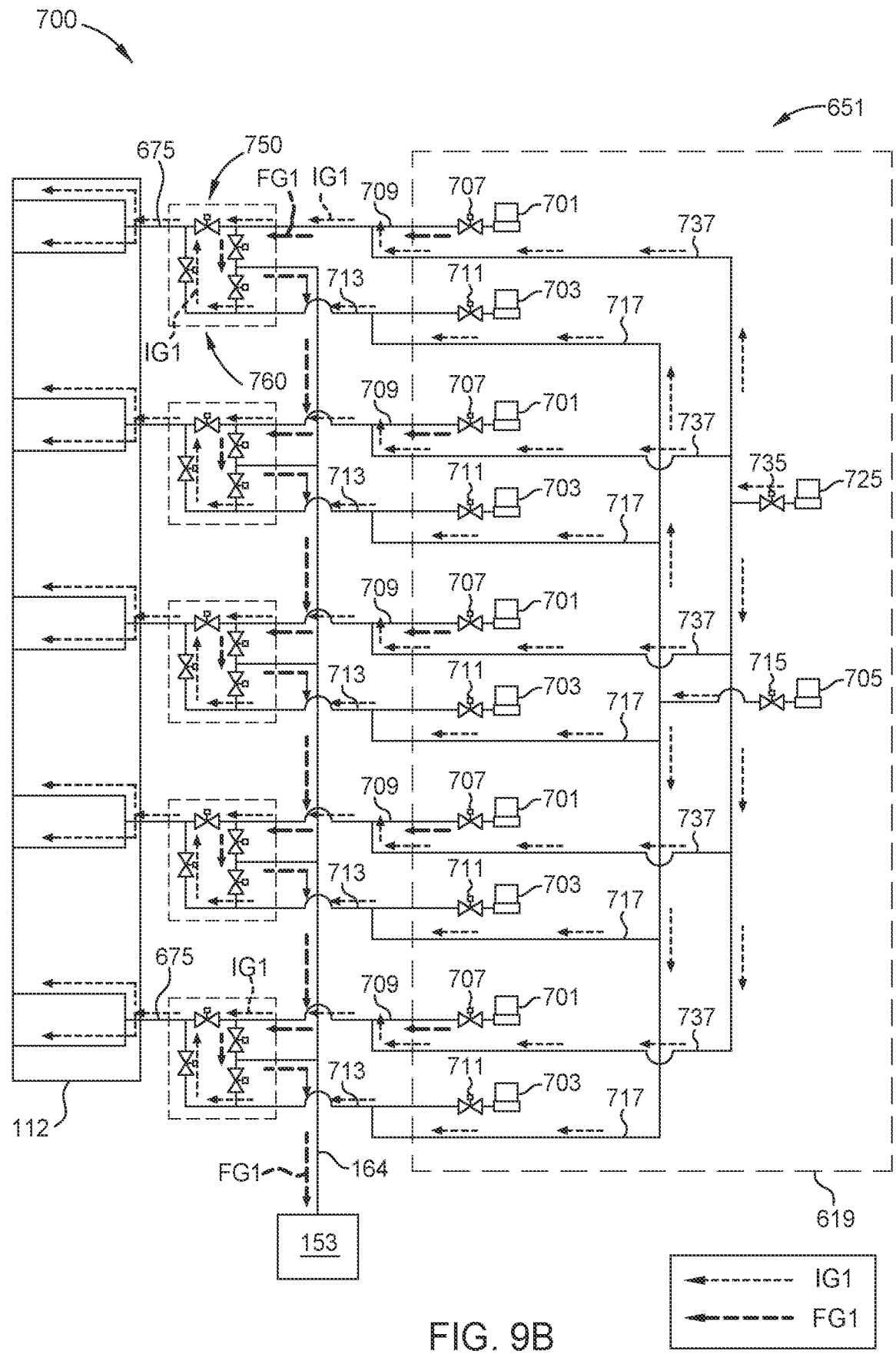

FIG. 9B shows the first gas FG1 being flowed through the vent line 164 to the vent outlet 153 in a stabilization procedure. In one or more embodiments, the second valve 760B is open and the inert gas IG1 flows through the second valve 760B to the gas lines 675 into the processing chamber 100. The first supply valves 707 and the first vent valves 760C are opened. The first valves 760A and the second vent valves 760D are closed. The first gas FG1 flows into the vent outlet 153. The first flow controllers 701 monitor and control a first flow rate of the first gas FG1. The first gases flows into the vent outlet 153 until the stabilization condition is met. When he stabilization condition is met, the first flow rate is stabilized and the flow of the first gas FG1 is switched (as shown in FIG. 9C).

The present disclosure contemplates that the inert gas IG1 that is shown as flowed to the first supply lines 709 from the first inert flow controller 725 in FIG. 9B can be omitted.

Figure 9C:
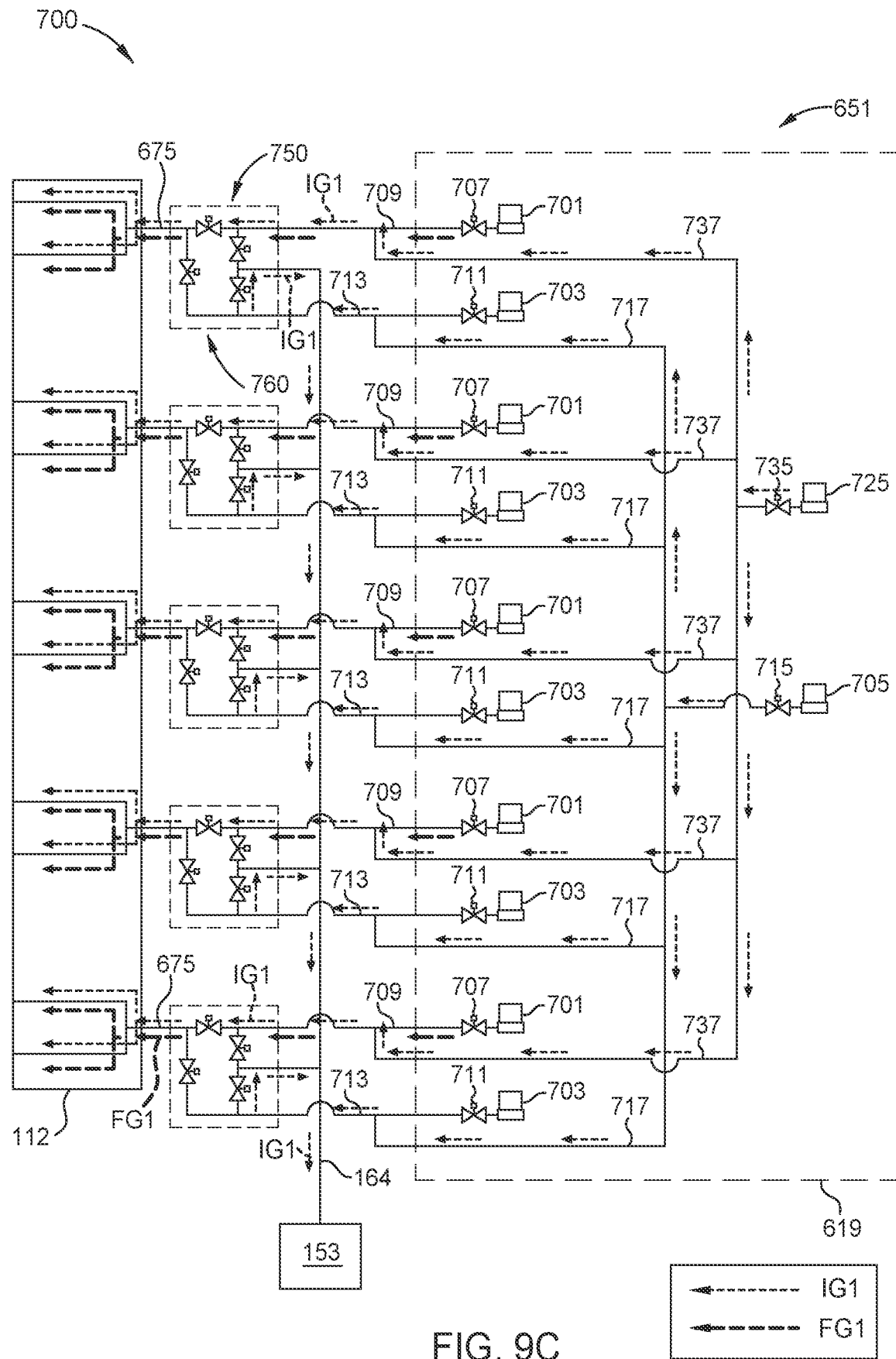

FIG. 9C shows the first gas FG1 switched to flow into the processing chamber 100 through the gas lines 675. The first vent valves 760C are closed and the first valves 760A are opened. The first gas FG1 can be suspended in the inert gas IG1 such that the inert gas IG1 functions as a carrier gas, and the first gas FG1 and the inert gas IG1 flow through the gas lines 675 into the processing chamber 100. The first gas FG1 enters the processing volume 136 through the gas openings 212a-212e and can be used to perform a deposition process on the substrate 102.

The present disclosure contemplates that if the inert gas IG1 is not flowed from the first inert flow controller 725 in FIG. 9B, then the first inert valve 735 can be opened in FIG. 9C to flow the inert gas IG1 to the first supply lines 709. In FIG. 9C, the inert gas IG1 flowing from the second inert flow controller 705 is flowed to the vent line 164.

Figure 9D:
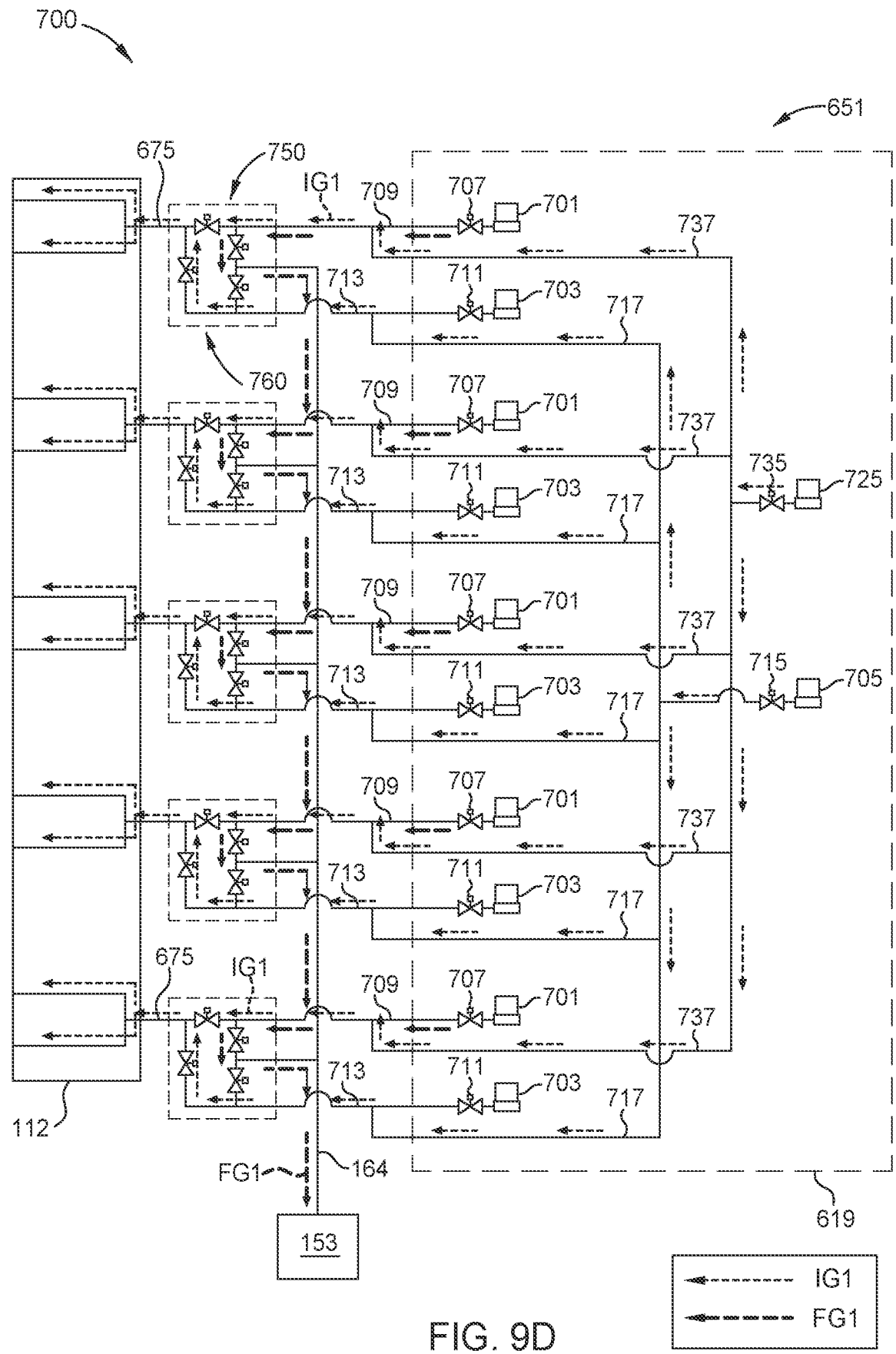

FIG. 9D shows the first gas FG1 being flowed through the vent line 164 to the vent outlet 153 in a second stabilization procedure. Once the deposition process is completed, the first valve 760A is closed. The first vent valve 760C is opened. The first gases flows into the vent outlet 153 until a second stabilization condition is achieved. The first gases are flowed into the vent outlet 153 until the second stabilization condition is met. When the second stabilization condition is met, the flow of the first gas FG1 is stabilized and the first supply valves 707 can be closed to turn off the flow of the first gas FG1 (as shown in FIG. 9E).

The present disclosure contemplates that the operations of FIG. 9D can be omitted from the method.

Although shown as off, the flow of inert gas IG1 from the first inert flow controller 725 can be on or off in FIGS. 9B, 9C, and 9D.

Figure 9E:
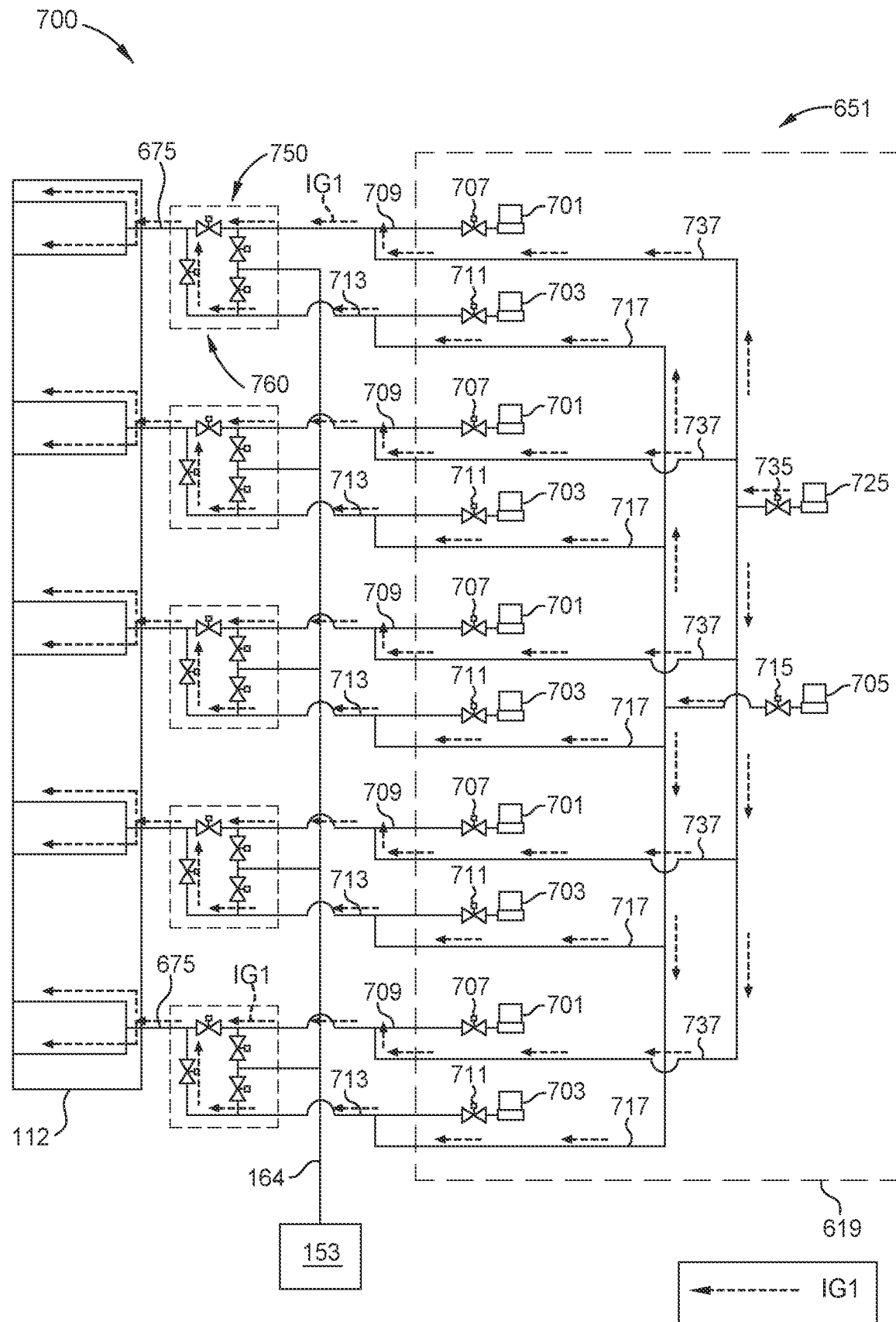

FIG. 9E shows the inert gas IG1 being flowed through the gas lines 675 and the flow of the first gas FG1 as stopped. The gas circuit 300 is in the same operable condition as shown in FIG. 9A. If the flow of the first inert flow controller 725 is off in FIG. 9D, then the first inert valve 735 can be opened at FIG. 9E.

Figure 9F:
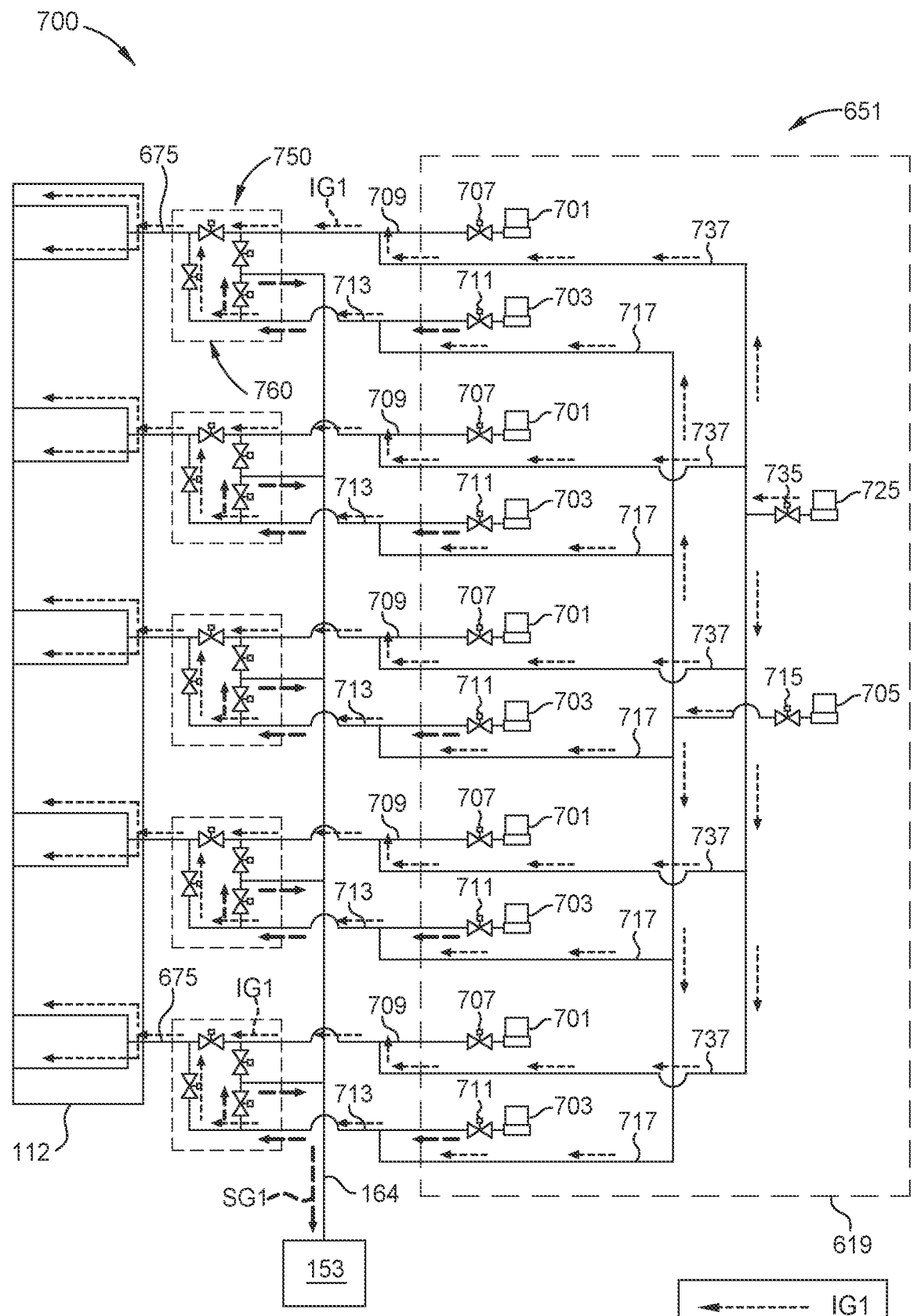

FIG. 9F shows the second gas SG1 being flowed through the vent line 164 to the vent outlet 153 in a third stabilization procedure. The inert gas IG1 continues to flow from the gas lines 675 into the processing chamber 100. The second flow valves 711 are opened. The second vent valves 760D are open and the second valves 760B are closed. The first valves 760A are open and the first vent valves 760C are closed. The second gases flow into the vent outlet 153. The second flow controllers 703 monitor and control a third flow rate of the second gas SG1. The second gas SG1 flows into the vent outlet 153 until the third stabilization is met. When the third stabilization condition is met, the second gas SG1 is stabilized and the flow of the second gas SG1 is switched (as shown in FIG. 9G).

The present disclosure contemplates that the inert gas IG1 that is shown as flowed to the second supply lines 714 from the second inert flow controller 705 in FIG. 9F can be omitted.

Figure 9G:
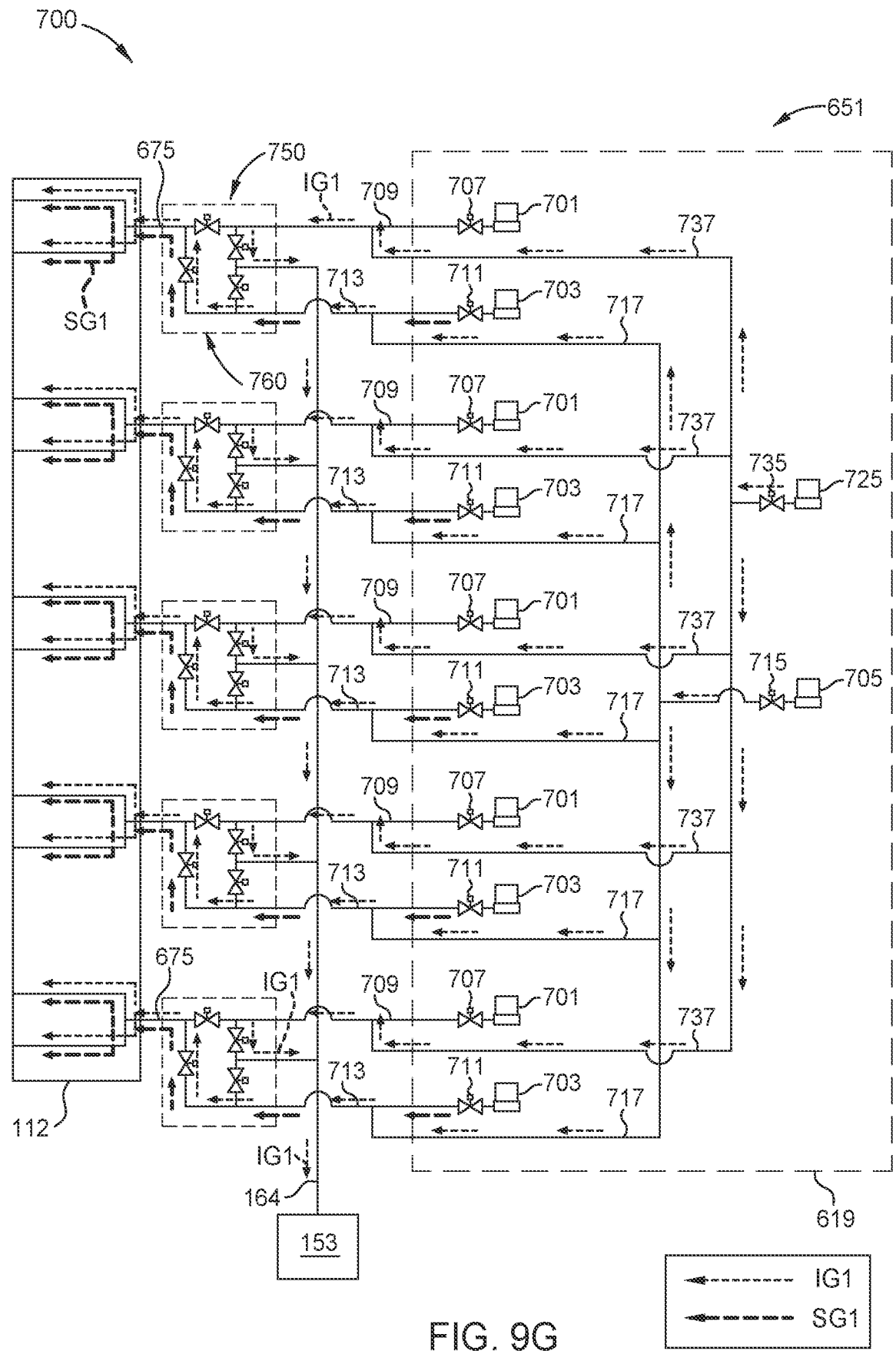

FIG. 9G shows the second gas SG1 being flowed into the processing chamber 100 through the gas lines 675. The second vent valves 760D are closed and the second valves 760B are open. The inert gas IG1 and second gas SG1 are flowed through the gas lines 675 into the processing chamber 100. The second flow controllers 703 monitor and control the flow of the second gas SG1. The second gas SG1 enter the processing volume 136 through the gas openings 212a-212e and are used to perform an etching process on the substrate 102 and/or cleaning operation on the processing chamber 100.

The present disclosure contemplates that if the inert gas IG1 is not flowed from the second inert flow controller 705 in FIG. 9F, then the second inert valve 715 can be opened in FIG. 9G to flow the inert gas IG1 to the second supply lines 713. In FIG. 9G, the inert gas IG1 flowing from the first inert flow controller 725 is flowed to the vent line 164.

After the etching process and/or the cleaning operation is completed, in one or more embodiments, the second gas SG1 may be switched back to flow through the vent outlet 153 and go through a fourth stabilization procedure and then turned off via the second supply valves 319 when the fourth stabilization condition is met. After a period of time, the inert gas IG1 can also be turned off.

Although shown as off, the flow of inert gas IG1 from the second inert flow controller 705 can be on or off in FIGS. 9F and 9G.

As shown in FIGS. 7A and 9A-9G, reactive gases (such as the first gas FG1 and the second gas SG1) are stabilized prior to flowing to downstream sides of the respective first flow controllers 701 or second ratio flow controllers 703 (both of which can function as ratio flow controllers). In one or more embodiments, the first gas FG1 and the second gas SG1 are supplied to the processing chamber 100 respectively through common gas lines 675.

Figure 10:
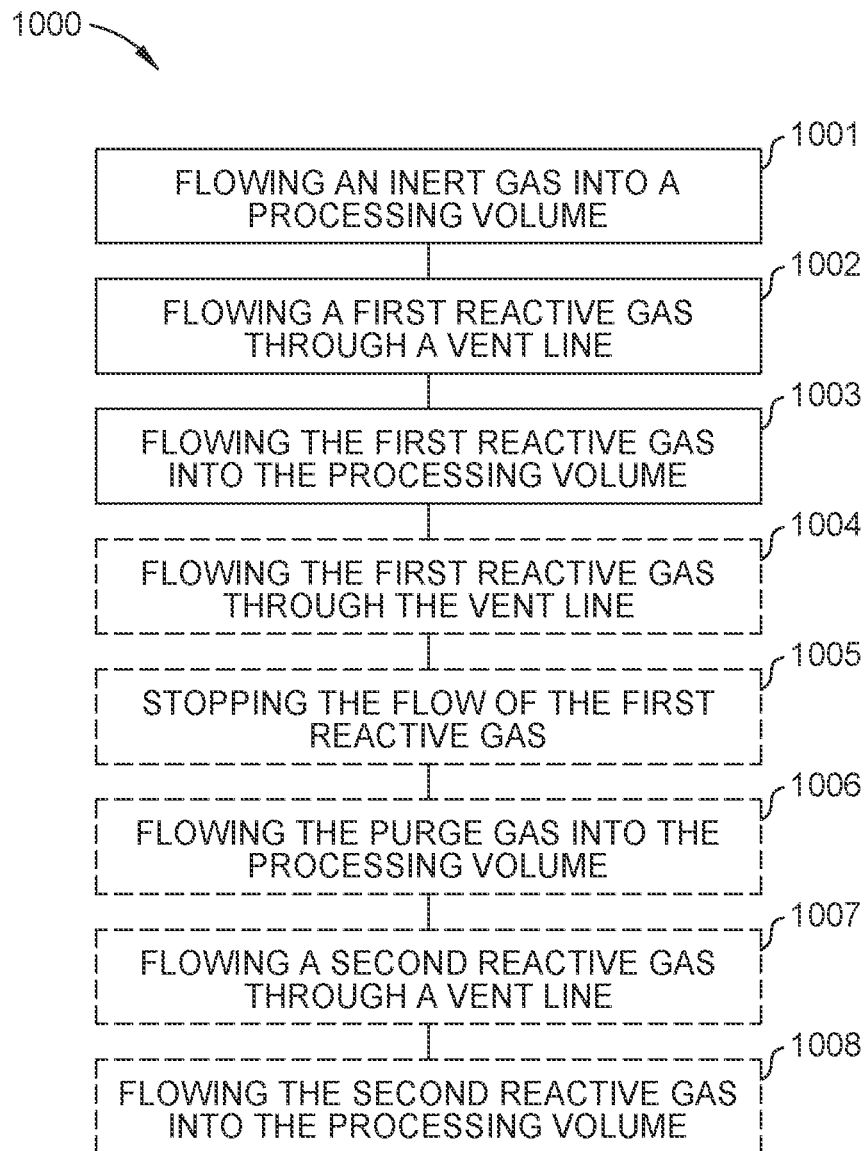
FIG. 10 is a schematic block diagram view of a method including the processes shown in FIGS. 9A-9G, according to one or more embodiments.

FIG. 10 is a schematic block diagram view of a method 1000 including the processes shown in FIGS. 9A-9G, according to one or more embodiments.

At operation 1001, an inert gas is flowed into a processing volume 136. The inert gas is flowed into the gas lines 675. Operation 1001 is further described with FIG. 9A.

At operation 1002, a first reactive gas is flowed through a vent line 164. The first gas flow is then stabilized to meet the stabilization condition. Operation 1002 is further described with FIG. 9B.

At operation 1003, the first reactive gas is flowed into the processing volume 136. The first gas performs a deposition process on the substrate 102. Operation 1003 is further described with FIG. 9C.

At optional operation 1004, the first reactive gas is flowed through the vent line 164. The first gas flow is then stabilized to meet the second stabilization condition. Operation 1004 is further described with FIG. 9D.

At optional operation 1005, the flow of the first reactive gas is stopped. After meeting the second stabilization condition, the first gas is turned off by closing the first supply valves 707. Operation 1005 is further described with FIG. 9D.

At optional operation 1006, the inert gas is flowed into the processing volume 136. Operation 1006 is further described with FIG. 9E. Operation 1006 can be omitted, for example, if the flow of the inert gas from operation 1001 continues to flow.

At optional operation 1007, the second reactive gas is flowed through a vent line 164. The second reactive gas flow is then stabilized to meet the third stabilization condition. Operation 1007 is further described with FIG. 9F.

At optional operation 1008, the second reactive gas is flowed into the processing volume 136. The second reactive gas can performs an etching process on the substrate 102 and/or a cleaning process on the processing chamber 100. Operation 1008 is further described with FIG. 9G.

The present disclosure contemplates that one or more operations of the method 1000 can be omitted. As an example, operation 1004 can be omitted from the method 1000.

Figure 11:
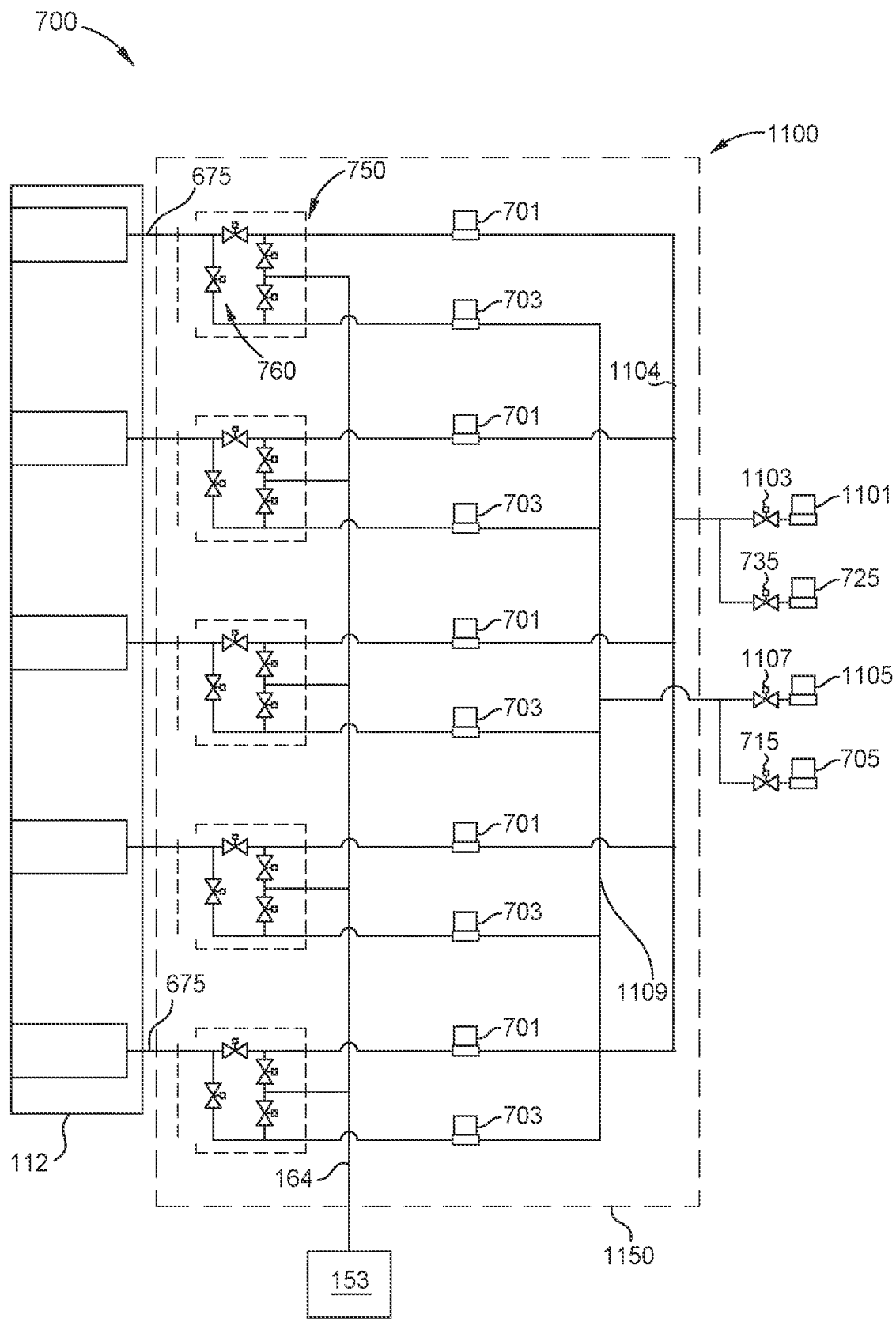
FIG. 11 is a schematic partial view of a gas circuit, according to one or more embodiments.

FIG. 11 is a schematic partial view of a gas circuit 1100, according to one or more embodiments. The gas circuit 1100 is similar to the gas circuit 700. The gas circuit 1100 can be used in place of or can be combined with the gas circuit 300. The gas panel 651 of gas circuit 700 is replaced with an injection manifold 1150 in the gas circuit 1100. The valve assemblies 750 are contained inside the injection manifold 1150. The gas circuit 1100 includes a primary flow controller 1101. The primary flow controller 1101 may supply the first gas FG1. The primary flow controller 1101 is connected to a primary valve 1103. The primary valve 1103 is connected to a primary gas line 1104. The primary valve 1103 can start and stop the flow of the first gas FG1 into the primary gas line 1104. The primary gas line 1104 connects to the plurality of first flow controllers 701 and the first supply lines 709. The gas circuit 1100 includes a cleaning flow controller 1105. The cleaning flow controller 1105 supplies clean gases to the second flow controllers 703. Clean gases can be used to purge and/or clean the processing chamber 100. Clean gases can include hydrochloric acid (HCl), chorine gas, and/or nitrogen gas, for example. In one or more embodiments, the clean gases include chlorine gas ($Cl_2$) suspended in a carrier gas that includes nitrogen gas ($N_2$). In one or more embodiments, the clean gases flow at a clean temperature within a range of 400 degrees Celsius to 1,200 degrees Celsius. In one or more embodiments, the clean temperature is within a range of 400 degrees Celsius to 800 degrees Celsius. In one or more embodiments, the clean temperature is within a range of 1,000 degrees Celsius to 1,200 degrees Celsius. The present disclosure contemplates that the clean gas(es) described herein can be used as etchant gas(es), and/or the etchant gas(es) described herein can be used as clean gas(es). The cleaning flow controller 1105 is connected to a clean valve 1107. The clean valve 1107 is connected to second flow controllers 703 through a clean gas line 1109. The clean valve 1107 starts and stops the flow of cleaning gases into the second flow controllers 703.

The present disclosure contemplates that the first inert flow controller 725 and the first inert valve 735 can be omitted, and the gas IG1 can be supplied to the one or more first flow controllers 701 through the primary flow controller 1101.

Figure 12:
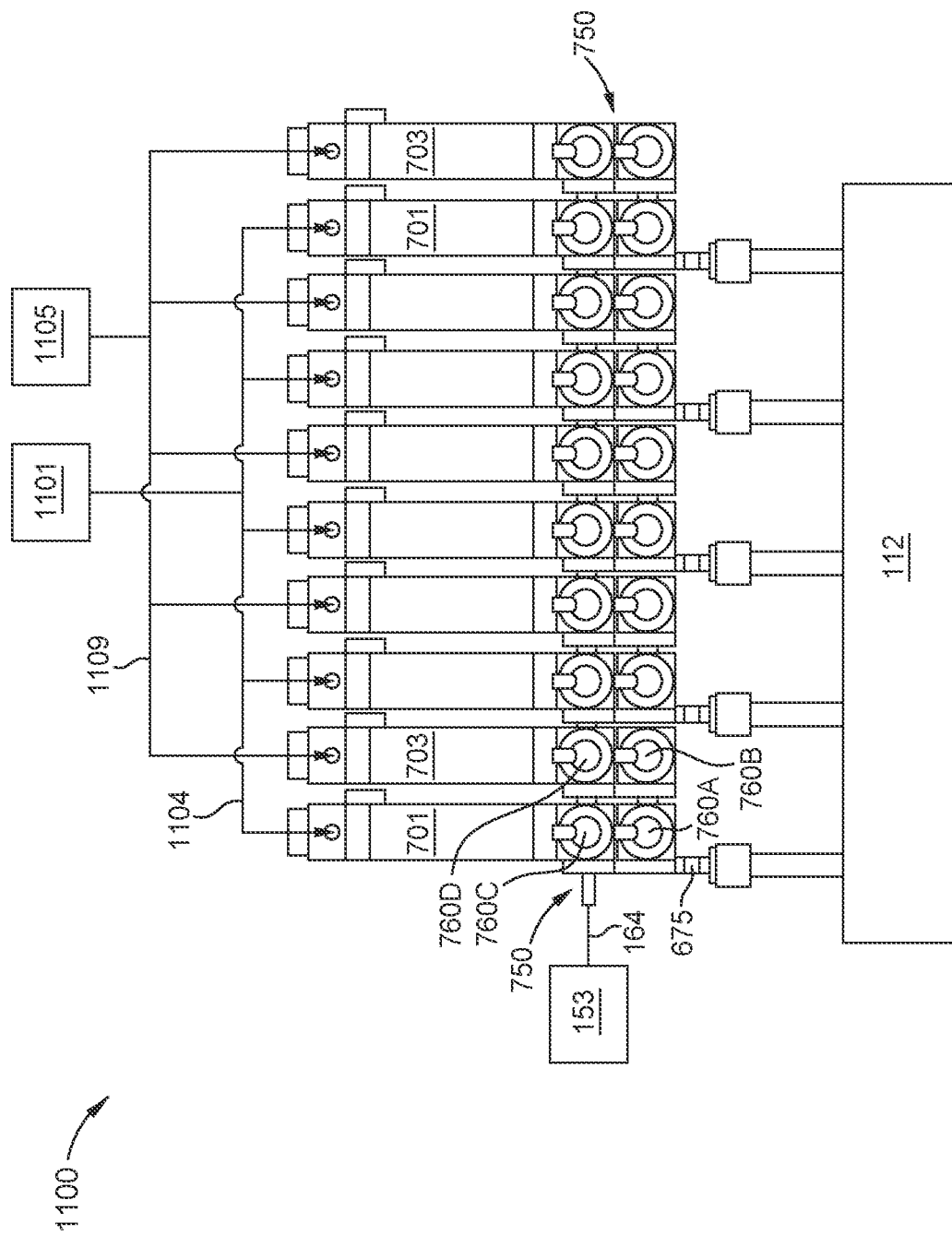
FIG. 12 is a schematic side view of the gas circuit shown in FIG. 11, according to one or more embodiments.

FIG. 12 is a schematic side view of the gas circuit 1100 shown in FIG. 11, according to one or more embodiments. FIG. 12 shows the orientation of the gas circuit 1100 when installed in the processing chamber 100. In one or more embodiments, the first and second flow controllers 701, 703 are coupled together in an alternating arrangement. In one or more embodiments, the one or more valve assemblies 750 are coupled to a respective first flow controller 701 and a respective second flow controller 703.

Figure 13:
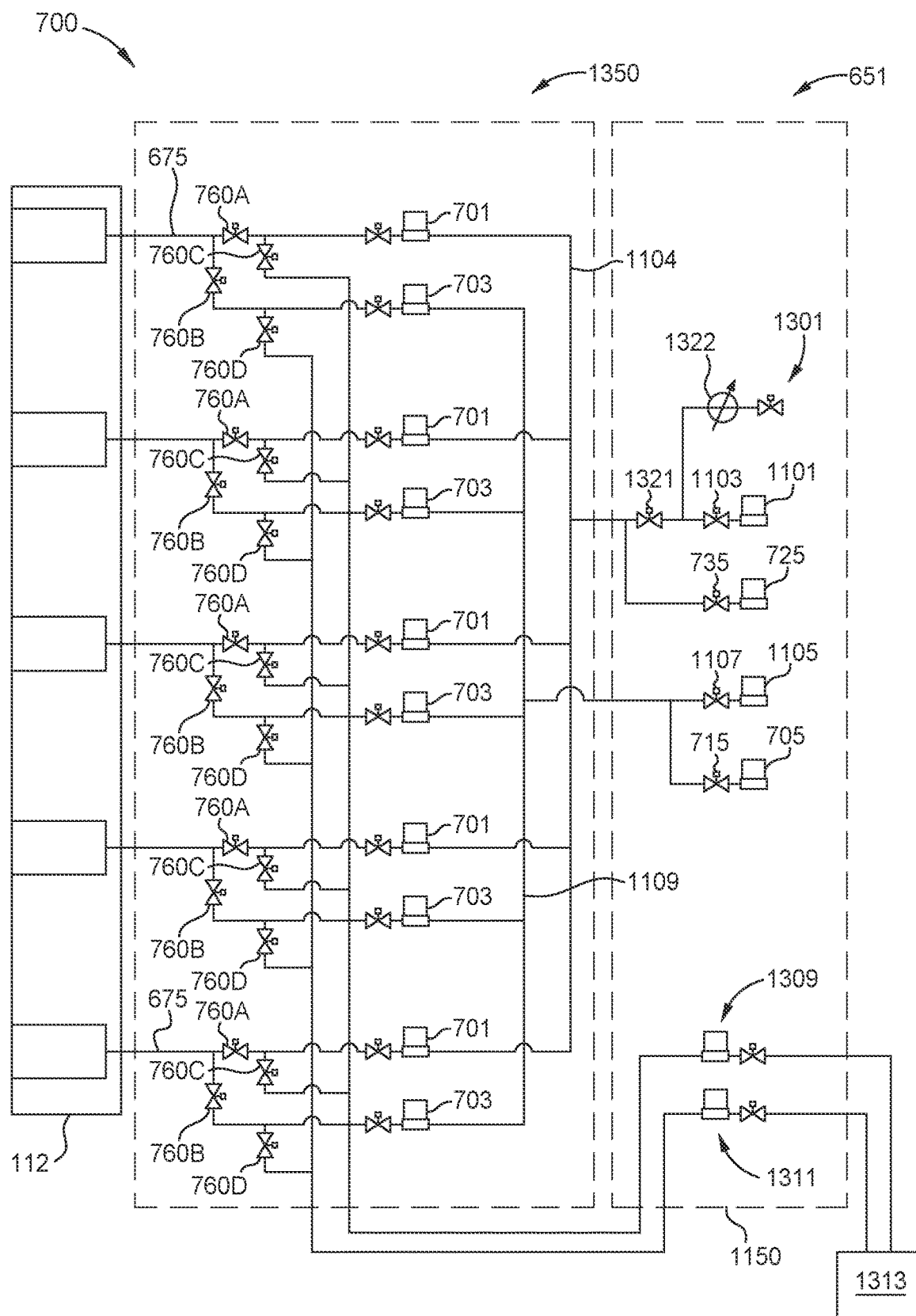
FIG. 13 is a schematic partial view of a gas circuit, according to one or more embodiments.

FIG. 13 is a schematic partial view of a gas circuit 1300, according to one or more embodiments. The gas circuit 1300 can be used in place of or can be combined with the gas circuit 300. The gas circuit 1300 includes the gas panel 651 and an inject manifold 1350. The inject manifold 1350 is similar to the inject manifold 1150 of the gas circuit 1100. The gas panel 651 includes a manifold flow valve 1301, a pressure transducer 1322 to measure a pressure of the primary flow line 1104, the primary flow controller 1101, the cleaning supply flow controller 1105, the first inert flow controller 725, the second inert flow controller 705, a first vent assembly 1309, and a second vent assembly 1311. The vent assemblies 1309, 1311 respectively include a vent flow controller and a downstream vent valve operable to vent the respective first gas FG1 or second gas SG1. The first vent assembly 1309 and the second vent assembly 1311 are attached to a foreline 1313. The manifold flow valve 1301, a primary valve 1321, and the primary flow controller 1101 are connected to the primary gas line 1104. The cleaning flow controller 1105 and the first inert flow controller 705 are connected to the clean gas line 1109. The valve assemblies 750 are oriented to allow the first gas to flow to the first vent assembly 1309 and the second gas to flow to the second vent assembly 1311 along two vent lines.

The present disclosure contemplates that the first inert flow controller 725 and the first inert valve 735 can be omitted, and the gas IG1 can be supplied to the one or more first flow controllers 701 through the primary flow controller 1101.

Figure 14A:
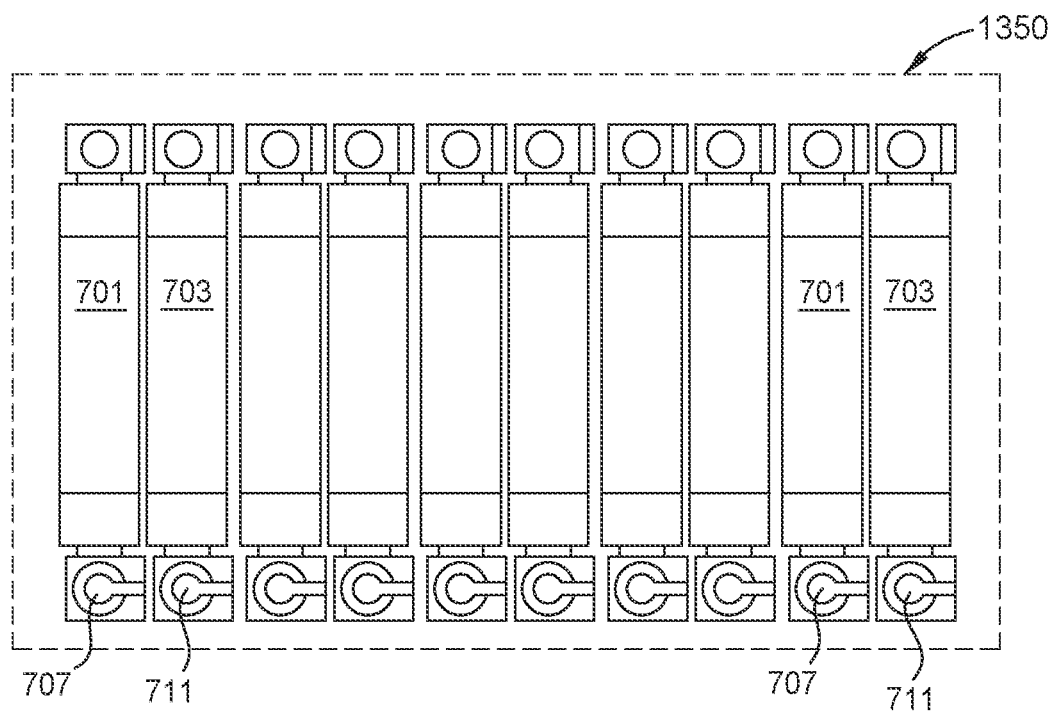
FIGS. 14A-14B are schematic side views of portion of the gas circuit, according to one or more embodiments.
Figure 14B:
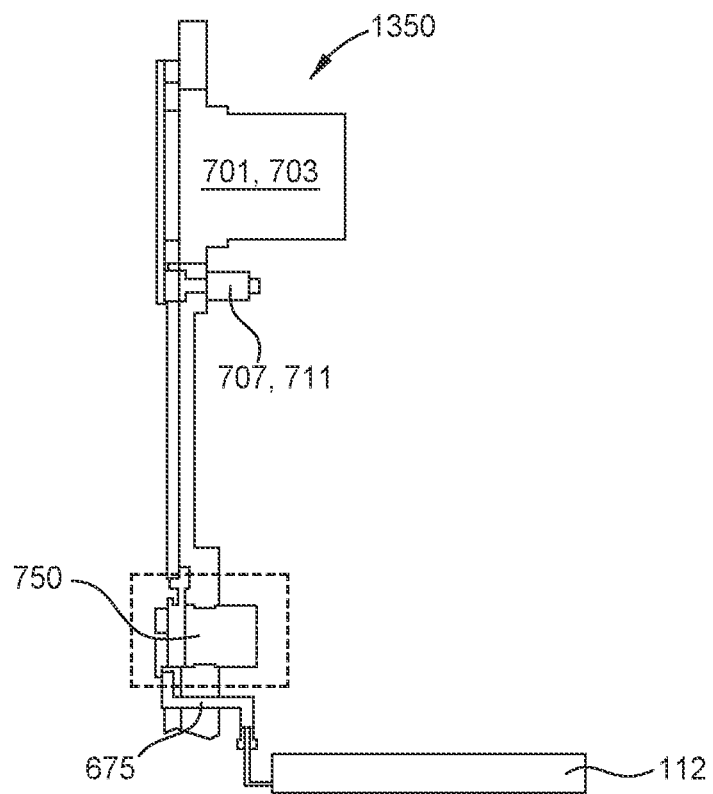

FIGS. 14A-14B are schematic side views of portion of the gas circuit 1300, according to one or more embodiments. FIG. 14B shows a view from the right of the view shown in FIG. 14A. FIG. 14A shows the inject manifold 1350 of the gas circuit 1300. FIG. 14B shows the orientation of the gas circuit 1300 when installed on the processing chamber 100 and connected to the injector 112.

Figure 15:
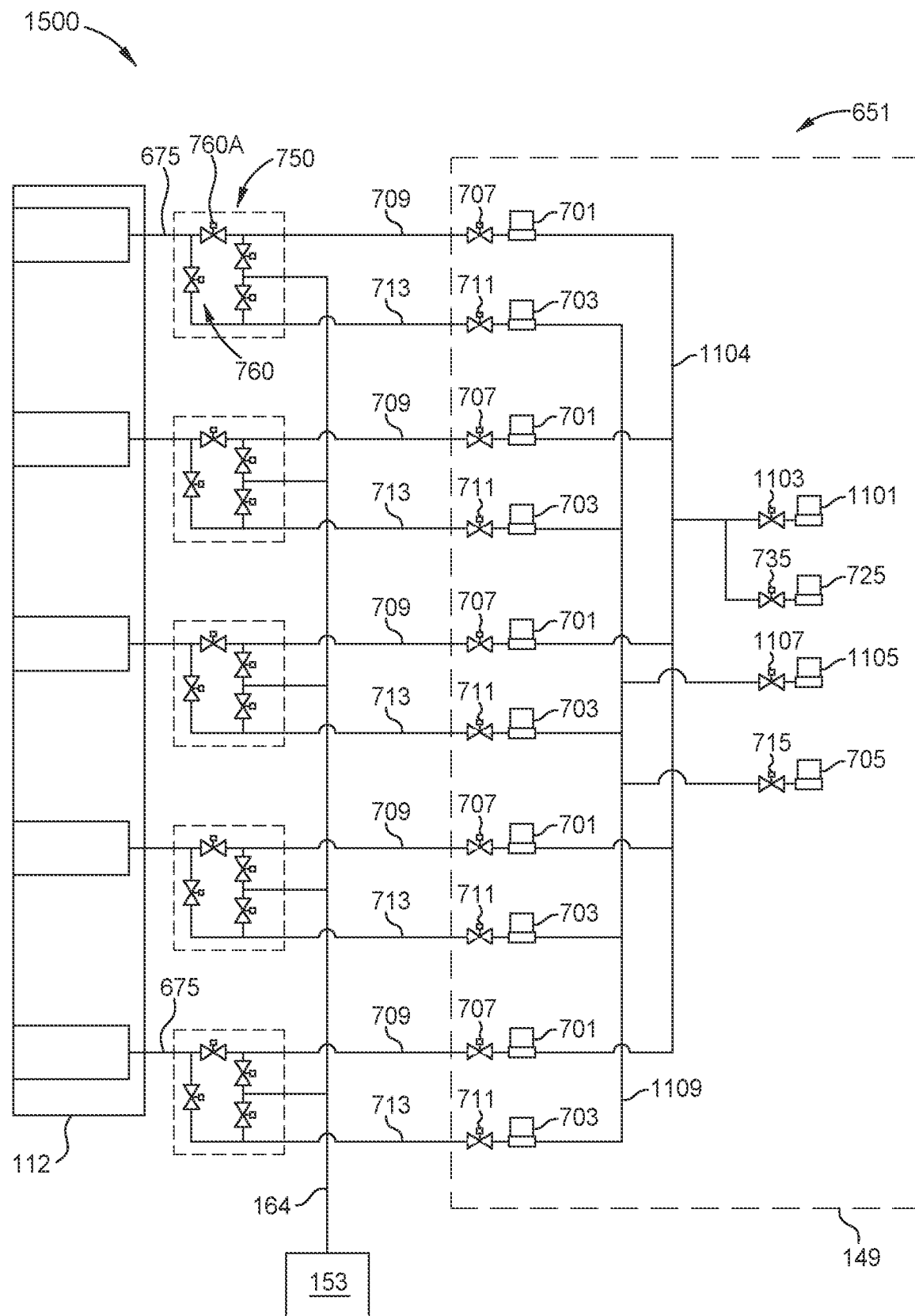
FIG. 15 is a schematic partial view of a gas circuit, according to one or more embodiments.

FIG. 15 is a schematic partial view of a gas circuit 1500, according to one or more embodiments. The gas circuit 1500 can be used in place of or can be combined with the gas circuit 300. The gas circuit 1500 is similar to the gas circuit 700 with the primary flow controller 1101 and the cleaning flow controller 1105 of the gas circuit 1100.

As shown in FIG. 15, the cleaning flow controller 1105 and the clean valve 1107 are connected to the clean gas line 1109. The present disclosure contemplates that the first inert flow controller 725 and the first inert valve 735 can be omitted, and the gas IG1 can be supplied to the one or more first flow controllers 701 through the primary flow controller 1101. In one or more embodiments, the respective first valves 760A of the valve assemblies 750 and the respective first supply valves 707 are maintained in the same operating position such that the respective first valves 760A and the respective first supply valves 707 are maintained in the same closed position or the same open position.

Figure 16:
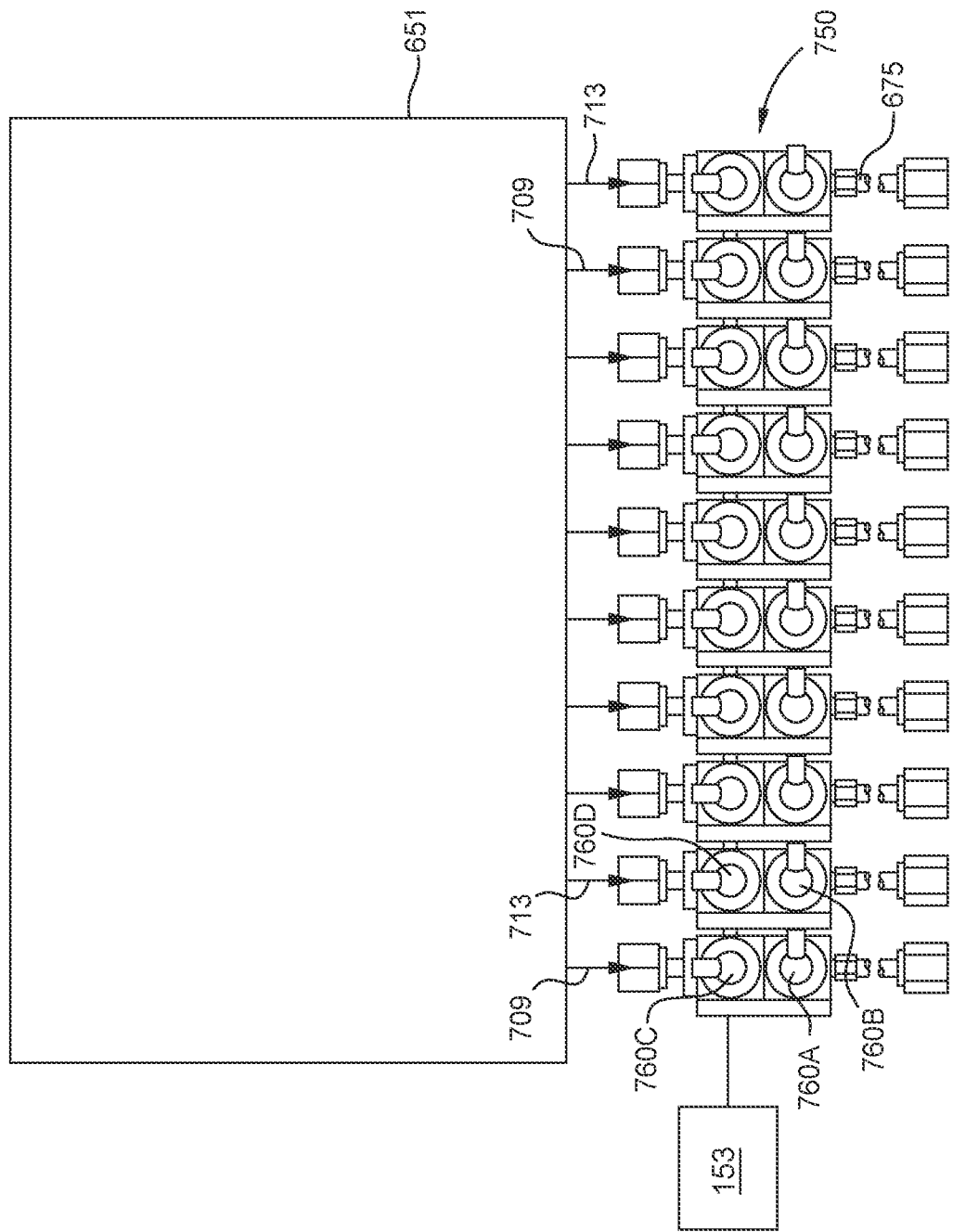
FIG. 16 is a schematic side view of a portion of the gas circuit shown in FIG. 15, according to one or more embodiments.

FIG. 16 is a schematic side view of a portion of the gas circuit 1300 shown in FIG. 13, according to one or more embodiments. FIG. 16 shows the orientation of the gas circuit 1300 installed on the processing chamber 100 (e.g., connected to the injector 112).

Figure 17:
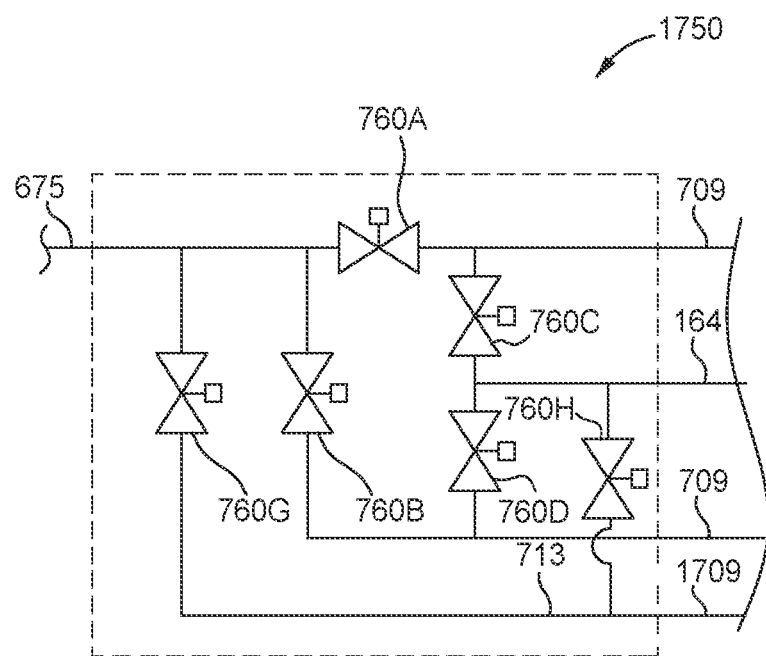
FIG. 17 is a schematic view of a valve assembly, according to one or more embodiments.

FIG. 17 is a schematic view of a valve assembly 1750, according to one or more embodiments. The valve assembly 1750 can be used in place of one or more of the valve assemblies 750 described above.

The valve assembly 1750 connects to a third supply line 1709. The valve assembly 1750 includes a third valve 760G that can supply a third gas TG1 to the injector 112, and a third vent valve 760H that can flow the third gas TG1 to the vent line 164.

In one or more embodiments, each of the valve assemblies 750 can switch between flowing the first gas FG1, the second gas SG1, and a third gas TG1. The third gas TG1 can be a deposition gas, a cleaning gas, or an etchant gas having a different composition than the first gas FG1 and the second gas SG1.

Figure 18:
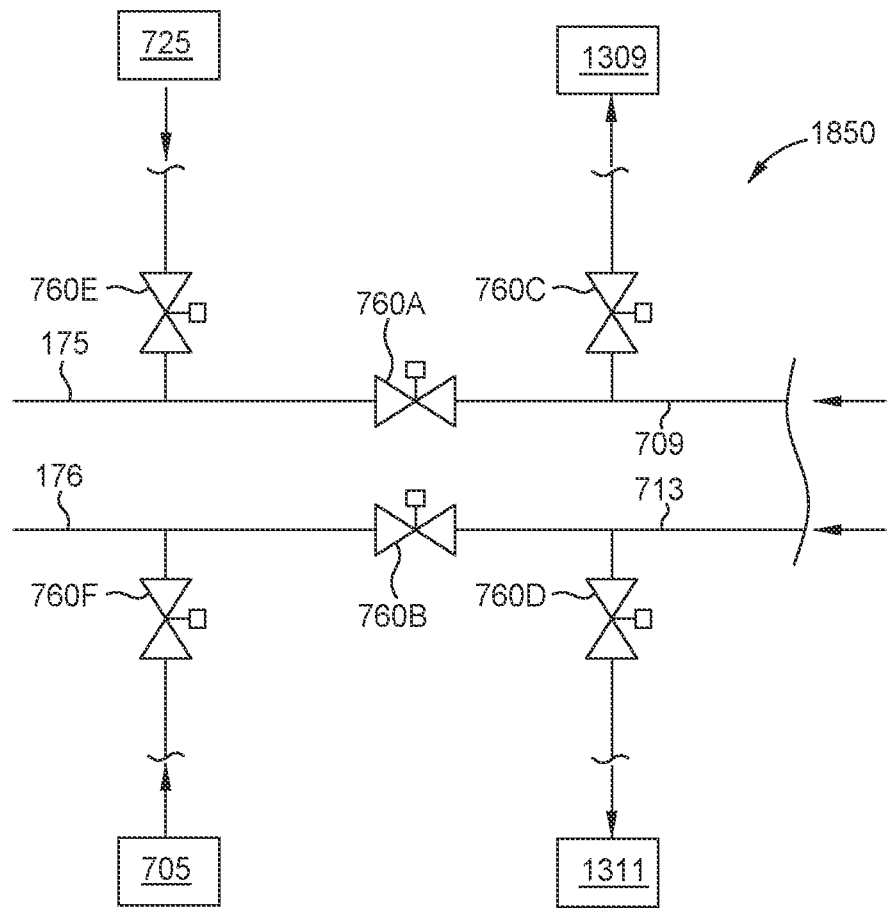
FIG. 18 is a schematic view of a valve assembly, according to one or more embodiments.

FIG. 18 is a schematic view of a valve assembly 1850, according to one or more embodiments. The valve assembly 1850 can be used in place of one or more of the valve assemblies 750 described above. The valve assembly 1850 is similar to the valve assembly 770 shown in FIG. 7C and includes one or more aspects, features, components, operations, and/or properties thereof.

In the valve assembly 1850, the first inert valve 760E receives gas from the first inert flow controller 725, and the second inert valve 760F separately receives gas from the second inert flow controller 705.

In the valve assembly 1850, the first vent valve 760C flows gas to the first vent assembly 1309, and the second vent valve 760D separately flows gas to the second vent assembly 1311.

The various flow controllers (including the ratio flow controllers and/or the supply flow controllers) described herein may be mass flow controllers. As described herein, at least some of the mass flow controllers may function as flow ratio controllers.

The present disclosure contemplates that the connections referred to herein can be fluid connections and/or mechanical connections. The present disclosure also contemplates that the connections referred to herein can be direct or indirect (such as through other components, for example other lines or valves).

The present disclosure contemplates that the valves described herein can be pneumatic valves, for example.

Benefits of the present disclosure include stabilizing the flow rate of gases (e.g., reactive gases) before flowing into the processing volume 136 and/or after flowing into the processing volume 136 using fast switching of the flow path(s) for the reactive gases. The gas circuits described facilitate quick switching between processes and/or recipes to facilitate short run times, reduced gas consumption, and increased throughput. The gas circuits allow for gases that may otherwise conflict with each other to be used during adjacent processes. For example, the present disclosure can save costs of using additional chambers for processing. As another example, a variety of chambers (e.g., including chambers at operating sites) can be retrofitted with the gas circuit implementations in the present disclosure with reduced modifications to the chamber(s) due to the modularity of the implementations. As an additional example, the gas circuits are simple and use simple controls for operation.

The present disclosure contemplates that the gas circuits described herein can be used in relation to a variety of other chambers (such as atomic layer deposition chambers and/or plasma chambers, for example).

It is contemplated that one or more aspects disclosed herein may be combined. As an example, one or more aspects, features, components, operations and/or properties of the processing chamber 100, the gas circuit 300, the gas circuit 700, the gas circuit 1100, the gas circuit 1300, the gas circuit 1500, the gas panel 151, the gas panel 651, the injection manifold 1150, the method 500, and/or the method 1000 may be combined. Moreover, it is contemplated that one or more aspects disclosed herein may include some or all of the aforementioned benefits.

While the foregoing is directed to embodiments of the present disclosure, other and further embodiments of the disclosure may be devised without departing from the basic scope thereof, and the scope thereof is determined by the claims that follow.

What is claimed is:

1. A gas circuit, comprising
one or more first flow controllers operable to flow a first gas;
one or more second flow controllers operable to flow a second gas; and
one or more valve assemblies, comprising:
a first supply line connected to a respective first flow controller;
a second supply line connected to a respective second flow controller; and
a plurality of valves operable to open and close the respective flow of the first gas and the second gas received from the one or more first flow controllers and the one or more second flow controllers, wherein the one or more valve assemblies further comprise a vent line and the one or more valve assemblies are connected, respectively, between one or more gas lines on one side and the one or more first flow controllers and the one or more second flow controllers on another side, wherein the plurality of valves comprise:
a first valve operable to flow the first gas to the one or more gas lines when open; and
a first vent valve operable to flow the first gas to the vent line when open, and when the first valve is closed.

2. The gas circuit of claim 1, wherein the plurality of valves further comprise:
a second valve operable to flow the second gas to the one or more gas lines when open; and
a second vent valve operable to flow the second gas to the vent line when open, and when the second valve and the first vent valve are closed.

3. The gas circuit of claim 2, wherein the second valve and the first vent valve are disposed in parallel.

4. The gas circuit of claim 1, further comprising:
one or more first supply valves disposed between the one or more valve assemblies and the one or more first flow controllers; and
one or more second supply valves disposed between the one or more valve assemblies and the one or more second flow controllers.

5. The gas circuit of claim 1, wherein the one or more first flow controllers and the one or more second flow controllers are disposed in a gas panel and are connected to the one or more valve assemblies via the first supply line and the second supply line.

6. The gas circuit of claim 5, wherein the gas panel further comprises:
a primary flow controller connected to the one or more first flow controllers, the primary flow controller operable to supply the first gas to the one or more first flow controllers; and
a cleaning flow controller connected to the one or more first flow controllers, the cleaning flow controller operable to supply a cleaning gas to the one or more first flow controllers.

7. The gas circuit of claim 6, wherein the gas panel further comprises:
an inert flow controller connected to the one or more second flow controllers, the inert flow controller operable to supply an inert gas to the one or more second flow controllers.

8. The gas circuit of claim 1, wherein the one or more first flow controllers, the one or more second flow controllers, and the one or more valve assemblies are disposed in an inject manifold.

9. The gas circuit of claim 8, further comprising a gas panel, the gas panel comprising:
a primary flow controller connected to the one or more first flow controllers, the primary flow controller operable to supply the first gas to the one or more first flow controllers;
an inert flow controller connected to the one or more second flow controllers, the inert flow controller operable to supply an inert gas to the one or more second flow controllers; and
a cleaning flow controller connected to the one or more second flow controllers, the cleaning flow controller operable to supply a cleaning gas to the one or more second flow controllers.

10. A process chamber, comprising:
a processing volume at least partially defined by a chamber body;

an injector operable to inject a first gas and a second gas into a plurality of zones of the processing volume;

one or more gas lines connected to the injector and operable to flow the first gas and the second gas to the injector;

one or more valve assemblies connected to the one or more gas lines, the one or more valve assemblies comprising:
- a plurality of valves operable to open and close the respective flow of the first gas and the second gas,
- a first supply line, and
- a second supply line, one or more first flow controllers operable to flow the first gas to the one or more valve assemblies, and one or more second flow controllers operable to flow the second gas to the one or more valve assemblies, wherein the one or more valve assemblies further comprise a vent line, wherein the plurality of valves comprise:
- a first valve operable to flow the first gas to the injector when open; and
- a first vent valve operable to flow the first gas to the vent line when open, and when the first valve is closed.

11. The process chamber of claim 10, wherein the plurality of valves further comprise:
- a second valve operable to flow the second gas to the injector when open; and
- a second vent valve operable to flow the second gas to the vent line when open, and when the second valve and the first vent valve are closed.

12. A method for substrate processing, comprising:

flowing an inert gas into a processing volume of a processing chamber through a first valve, wherein the processing chamber includes:

an injector operable to inject a first gas and a second gas into a plurality of zones of the processing volume;

one or more gas lines connected to the injector and operable to flow the first gas and the second gas to the injector;

one or more valve assemblies connected to the one or more gas lines, the one or more valve assemblies comprising:
- a plurality of valves operable to open and close the respective flow of the first gas and the second gas,
- a first supply line, and
- a second supply line, one or more first flow controllers operable to flow the first gas to the one or more valve assemblies, and one or more second flow controllers operable to flow the second gas to the one or more valve assemblies, wherein the one or more valve assemblies further comprise a vent line, wherein the plurality of valves comprise:

a first valve operable to flow the first gas to the injector when open; and a first vent valve operable to flow the first gas to the vent line when open, and when the first valve is closed flowing the first gas to the vent line through the first vent valve until a stabilization condition is met; and when the stabilization condition is met, switching the first gas to flow into the processing volume while the inert gas is flowing into the processing volume, the switching comprising:
- closing the first vent valve and opening a second valve while the first valve is open.

13. The method of claim 12, further comprising:

stopping the flow of the first gas;
- flowing a second gas to a vent line until a second stabilization condition is met; and
- when the second stabilization condition is met, switching the second gas to flow through into the processing volume.

14. The method of claim 12, wherein the stabilization condition includes achieving a first flow rate of the first gas and maintaining the first flow rate within a first range for a first time period.

* * * * *